(12) United States Patent
Garner

(10) Patent No.: US 11,161,703 B2
(45) Date of Patent: Nov. 2, 2021

(54) SYSTEM, APPARATUS, AND METHOD FOR FREIGHT REDISTRIBUTION

(71) Applicant: Garner Green CO2 Inc., Toronto (CA)

(72) Inventor: Hilary Paige Garner, Toronto (CA)

(*) Notice: Subject to any disclaimer, the term of this patent is extended or adjusted under 35 U.S.C. 154(b) by 0 days.

(21) Appl. No.: 16/967,633

(22) PCT Filed: Feb. 5, 2018

(86) PCT No.: PCT/CA2018/050126
§ 371 (c)(1),
(2) Date: Aug. 5, 2020

(87) PCT Pub. No.: WO2019/148263
PCT Pub. Date: Aug. 8, 2019

(65) Prior Publication Data
US 2021/0122590 A1    Apr. 29, 2021

(51) Int. Cl.
*B65G 67/20* (2006.01)
*B65G 67/24* (2006.01)

(52) U.S. Cl.
CPC ............. *B65G 67/20* (2013.01); *B65G 67/24* (2013.01); *B65G 2201/0235* (2013.01)

(58) Field of Classification Search
None
See application file for complete search history.

(56) References Cited

U.S. PATENT DOCUMENTS

| | | | | |
|---|---|---|---|---|
| 3,834,562 A | * | 9/1974 | Norrie | B65G 69/008 414/344 |
| 6,179,535 B1 | * | 1/2001 | Bouchard | B60J 5/08 296/24.4 |
| 7,454,811 B1 | * | 11/2008 | Stotka | B65G 69/30 14/69.5 |
| 9,457,970 B1 | * | 10/2016 | Zevenbergen | B65G 15/22 |
| 9,511,960 B1 | * | 12/2016 | Bradford | B60J 5/08 |
| 9,567,168 B1 | * | 2/2017 | Tibbens | B65D 88/027 |
| 9,884,734 B1 | * | 2/2018 | Garner | B65G 63/002 |
| 10,137,816 B2 | * | 11/2018 | Harper | G06Q 10/0833 |
| 10,807,661 B2 | * | 10/2020 | Deal | B65D 88/129 |
| 2009/0297304 A1 | * | 12/2009 | Campbell | B65G 63/002 414/340 |

FOREIGN PATENT DOCUMENTS

WO    WO 2010/076591    *    7/2010    .............. B60R 7/04

* cited by examiner

*Primary Examiner* — Mark C Hageman
(74) *Attorney, Agent, or Firm* — McMillan LLP

(57) ABSTRACT

Systems and methods of distributing freight between freight containers are provided. In one aspect, the method includes receiving loading/unloading openings of three freight containers at three openings in a moveable cross-dock having a plurality of surface road wheels, a body defining an interior storage area, and at least three openings in the body through which freight may be moved into and out of the interior storage area. Freight is redistributed between the first freight container, the second freight container, and the third freight container via the at least three openings in the body of the moveable cross-dock.

14 Claims, 14 Drawing Sheets

SYSTEM, APPARATUS, AND METHOD FOR FREIGHT REDISTRIBUTION

FIELD

The invention relates generally to shipping and, more particularly, to a system, apparatus and method for freight redistribution between freight containers.

BACKGROUND OF THE DISCLOSURE

From the rapid expansion of railways in the late nineteenth century up until the mid-twentieth century, rail was the predominate method of overland transportation for freight in North America. The post-Second World War construction of an extensive network of high-speed highways transitioned substantial amounts of freight movement to trucking, and trucking has dominated as a transportation method for many categories of freight until the present. In recent years, however, a number of factors have had a negative effect on long distance trucking. First, as fuel costs have risen, the cost advantage has shifted to rail, which uses up to 70% less fuel per ton-mile. Secondly, because of the need to be away from home for several days at a time, younger drivers are not being attracted to these jobs and the age profile of truck drivers is steadily increasing. Together with the physical demands of the job, competitive pressure to exceed legally-imposed limits on daily driving hours and safety issues after driving many hours, labor shortages are beginning to appear. Finally, a recent trend toward state legislation imposing large fines for excessive carbon and particulate emissions, enhanced by the desire of corporate and government clients to show their stakeholders reductions in greenhouse gases, has made trucking both more costly and less desirable.

In contrast, rail shipping has much lower fuel costs, uses far fewer drivers and has a far superior safety record.

Railroad cars, commonly referred to as "boxcars", were the original method used for rail freight. Generally, boxcars are unloaded at relatively large terminal facilities including a cross-dock area and warehousing space. Freight is unloaded by forklift, stored temporarily, and then moved again to surface-road transports, such as semi-trucks. In the case of refrigerated or freezer freight, there are few facilities that can provide this specialized storage on rail.

In recent years, very few facilities for hardy produce have been built, and then only for specific shipping corridors; e.g., California and Texas to the U.S. East Coast. These rail terminals comprise elaborate indoor facilities occupying many acres so as to accommodate multiple railroad car trains at once. At present there is only one operator serving coast to coast hardy produce, and rail only accounts for a very small percentage of these kinds of movements. Moreover, such facilities are expensive to build. As there are very few of these terminal facilities, transport trucks have to drive significant distances to load and unload freight, making intermodal transportation of such freight by train less cost-effective.

Over time, the railroad industry has expanded the types of freight carrying vehicles to better accommodate the variety of freight being transported. The use of multi-purpose, intermodal shipping containers is one example. Such intermodal containers, which are essentially rectangular storage containers with one or more loading/unloading openings permitting access to interior storage areas, are configured to be stacked for ship-borne transportation, to be individually loaded atop flatbed trailers, or chassis, and driven via surface roads by transport truck, and to be individually loaded atop railroad well cars for transport by train. In an exemplary shipping scenario, such intermodal containers may be (i) loaded with freight at a manufacturing facility, (ii) the loaded intermodal containers placed on chassis and driven via surface roads to dockside where (iii) the intermodal containers are removed from the chassis and loaded onto a ship for sea-borne transport. When the ship arrives at its destination, the intermodal containers are unloaded and placed, individually, on chassis for movement via surface roads by transport truck. While some such intermodal containers will travel by truck to their ultimate destinations, others of these intermodal containers will travel to intermodal terminals where they are placed, individually, on railroad well cars for shipment by train to a remote intermodal terminal where, once again, the intermodal containers are removed from the railroad cars and placed on chassis for truck transportation via surface roads to their ultimate destinations, where the freight is unloaded.

While intermodal containers enable the freight being shipped to be loaded once at the manufacturing facility or other initial destination and unloaded at the final destination, this advantage comes at a cost. Weight restrictions on surface-road transport (such as semi-trucks, etc.) are lower than the physical limitations of the intermodal containers and, moreover, are lower than the weight restrictions placed on railway transportation. For instance, intermodal containers may have a rail payload limit of approximately 58,000 to 60,000 pounds, but a net weight limit for surface road transportation of roughly 44,000 pounds or less when full (after taking into account the weight of the surface-road transport). To complicate matters further, these weight restrictions on surface-road transports vary from state to state in the U.S., meaning that shipments traversing multiple states must meet the lowest applicable weight restrictions of the states through which the freight is being transported. Given the foregoing, some of the advantages of intermodal containers are lost as those containers are generally transported via rail at or below their capacity for the longest leg of the transportation.

SUMMARY OF THE DISCLOSURE

According to an aspect, there is provided a method of redistributing freight between freight containers, the method comprising: receiving a loading/unloading opening of a first freight container at a first of at least three openings in a moveable cross-dock having a plurality of surface road wheels, a body defining an interior storage area, and at least three openings in the body through which freight may be moved into and out of the interior storage area; receiving a loading/unloading opening of a second freight container at a second of the at least three openings in the body of the moveable cross-dock; receiving a loading/unloading opening of a third freight container at a third of the at least three openings in the moveable cross-dock while the loading/unloading openings of the first and second freight containers are proximate the first and second openings in the body of the moveable cross-dock; and redistributing freight between the first freight container, the second freight container, and the third freight container via the at least three openings in the body of the moveable cross-dock.

The moveable cross-dock can be transported via a surface road. The receiving of the loading/unloading opening of the first freight container at the first of the at least three openings in the body of the moveable cross-dock can include moving the first freight container relative to the moveable cross-dock after transporting of the moveable cross-dock.

The freight can include perishable freight, and the interior storage area of the moveable cross-dock body can be a temperature-controlled storage area.

The method can further include extending a distal end of a first loading tunnel surrounding the first of the at least three openings in the body of the moveable cross-dock towards the loading/unloading opening of the first freight container. The method can also include extending a distal end of a second loading tunnel surrounding the second of the at least three openings in the body of the moveable cross-dock towards the loading/unloading opening of the second freight container. The method can still further include extending a distal end of a third loading tunnel surrounding the third of the at least three openings in the body of the moveable cross-dock towards the loading/unloading opening of the third freight container.

The method can further include: separating from the loading/unloading opening of one of the first freight container, the second freight container, and the third freight container at a corresponding one of the first of the at least three openings, the second of the at least three openings, and the third of the at least three openings; receiving a loading/unloading opening of a fourth freight container at the corresponding one of the first of the at least three openings, the second of the at least three openings, and the third of the at least three openings; and redistributing freight between the fourth freight container and another of the first freight container, the second freight container, and the third freight container via the at least three openings in the body of the moveable cross-dock.

The first freight container can be an intermodal shipping container.

The loading/unloading opening of the first freight container can be at a longitudinal end thereof, and the first of the at least three openings can be in a lateral wall of the body of the moveable cross-dock, the lateral wall extending along a longitudinal axis of the moveable cross-dock.

The loading/unloading openings of the first freight container, the second freight container, and the third freight container can be located at the longitudinal ends thereof, and the at least three openings in the body of the moveable cross-dock can be dimensioned to correspond to the loading/unloading openings of the first freight container, the second freight container, and the third freight container.

The transporting of the moveable cross-dock can include coupling the moveable cross-dock to a surface road vehicle, the surface road vehicle being driven to transport the moveable cross-dock.

According to another aspect, there is provided a method of redistributing freight between freight containers, the method comprising: receiving a first freight container at a first of at least three openings in a body of a moveable cross-dock through which freight may be moved into and out of the interior storage area of the body, the moveable cross-dock having a plurality of surface road wheels, a loading/unloading opening of the first freight container being aligned with the first of the at least three openings in the body of the moveable cross-dock; receiving a second freight container at a second of the at least three openings in the moveable cross-dock, a loading/unloading opening of the second freight container being aligned with the second of the at least three openings in the moveable cross-dock; receiving a third freight container at a third of the at least three openings in the moveable cross-dock while the loading/unloading openings of the first and second freight containers are proximate the first and second openings in the moveable cross-dock, a loading/unloading opening of the third freight container being aligned with the third of the at least three openings in the body of the moveable cross-dock; and redistributing freight between the first freight container, the second freight container, and the third freight container via the at least three openings of the moveable cross-dock.

The method can further include transporting the moveable cross-dock via a surface road.

The freight can be perishable freight, and wherein the interior storage area of the moveable cross-dock body is a temperature-controlled storage area.

The method can further include extending a distal end of a first loading tunnel surrounding the first of the at least three openings in the body of the moveable cross-dock towards the loading/unloading opening of the first freight container.

According to a further aspect, there is provided a method of redistributing freight between freight containers, the method comprising redistributing freight between a first freight container, a second freight container, and a third freight container via a moveable cross-dock having a plurality of surface road wheels, a body defining an interior storage area, and at least three openings in the body through which freight may be moved into and out of the interior storage area, the first freight container having a loading/unloading opening aligned with a first of the at least three openings in the body of the moveable cross-dock, the second freight container having a loading/unloading opening aligned with a second of the at least three openings in the body of the moveable cross-dock, and the third freight container having a loading/unloading opening aligned with a third of the at least three openings in the body of the moveable cross-dock.

The method can further include transporting the moveable cross-dock via a surface road.

The freight can be perishable freight, and the interior storage area of the moveable cross-dock body can be a temperature-controlled storage area.

The method can further include extending a distal end of a first loading tunnel surrounding the first of the at least three openings in the body of the moveable cross-dock towards the loading/unloading opening of the first freight container.

According to yet another aspect, there is provided a method of redistributing freight between freight containers, the method comprising: transporting a moveable cross-dock to a freight redistribution location via surface roads, the cross-dock having a plurality of surface road wheels, a body defining an interior storage area, and at least three openings in the body through which freight may be moved into and out of the interior storage area; positioning a loading/unloading opening of a first freight container so that the loading/unloading opening of the first freight container is proximate a first of the at least three openings in the moveable cross-dock; positioning a loading/unloading opening of a second freight container of a first surface-road transport proximate a second of the at least three openings in the moveable cross-dock; positioning a loading/unloading opening of a third freight container of a second surface-road transport proximate a third of the at least three openings in the moveable cross-dock while the loading/unloading openings of the first and second freight containers are proximate the first and second openings in the moveable cross-dock; and redistributing freight between the first freight container, the second freight container, and the third freight container via the at least three openings of the moveable cross-dock.

The positioning of the loading/unloading opening of the first freight container proximate one of the at least three openings in the moveable cross-dock can include moving the first freight container relative to the moveable cross-dock after transporting of the moveable cross-dock.

The freight can be perishable freight, and wherein the interior storage area of the moveable cross-dock body is a temperature-controlled storage area.

The moveable cross-dock can further include a loading tunnel surrounding each of the at least three openings, an end of each loading tunnel being configured to be positioned adjacent the loading/unloading opening in one of the first, second, and third freight containers, wherein the positioning of the loading/unloading opening of the first freight container proximate the first of the at least three openings in the moveable cross-dock can include positioning the loading/unloading opening in the first freight container in close proximity to the end of the loading tunnel surrounding the first opening of the moveable cross-dock, wherein the positioning of the loading/unloading opening of the second freight container proximate the second of the at least three openings in the moveable cross-dock can include positioning the loading/unloading opening in the second freight container in close proximity to the end of the loading tunnel surrounding the second opening of the moveable cross-dock; and wherein the positioning of the loading/unloading opening of the third freight container proximate the third of the at least three openings in the moveable cross-dock can include positioning the loading/unloading opening in the third freight container in close proximity to the end of the loading tunnel surrounding the third opening of the moveable cross-dock.

The method can further include: moving the second freight container of the first surface-road transport away from the second opening of the moveable cross-dock after a desired amount of freight has been redistributed between the first, second, and third freight containers; positioning a fourth freight container of a third surface-road transport, so that a loading/unloading opening of the fourth freight container of the third surface-road transport is positioned proximate the second opening in the moveable cross-dock; and redistributing freight to the fourth freight container via the at least three openings of the moveable cross-dock.

The first freight container can be an intermodal shipping container.

The loading/unloading opening of the first freight container can be at a longitudinal end thereof, and the first freight container can extend perpendicularly away from the moveable cross-dock when the first freight container and the moveable cross-dock are positioned at the freight redistribution location.

The loading/unloading openings of the first freight container, the second freight container, and the third freight container can be located at the longitudinal ends thereof respectively, and the at least three openings of the moveable cross-dock can be dimensioned to generally correspond to the loading/unloading openings of the first freight container, the second freight container, and the third freight container.

The transporting can include coupling the moveable cross-dock to a surface road vehicle, and the surface road vehicle can be driven to transport the moveable cross-dock.

According to still yet another aspect, there is provided a method of redistributing freight between freight containers, the method comprising: transporting a moveable cross-dock to a freight redistribution location via surface roads, the cross-dock having a plurality of surface road wheels, a body defining an interior storage area, and at least three openings in the body through which freight may be moved into and out of the interior storage area; moving a loading/unloading opening of a first freight container so that the loading/unloading opening of the first freight container is proximate a first of the at least three openings in the moveable cross-dock; moving a loading/unloading opening of a second freight container of a first surface-road transport proximate a second of the at least three openings in the moveable cross-dock; moving a loading/unloading opening of a third freight container of a second surface-road transport proximate a third of the at least three openings in the moveable cross-dock; and redistributing freight between the first freight container, the second freight container, and the third freight container via the at least three openings of the moveable cross-dock while the loading/unloading openings of the first, second, and third freight containers are proximate the first, second, and third openings in the moveable cross-dock.

The method can further include: moving the second freight container of the first surface-road transport away from the second opening of the moveable cross-dock after a desired amount of freight has been redistributed between the first, second, and third freight containers; moving a fourth freight container of a third surface-road transport so that a loading/unloading opening of the fourth freight container is positioned proximate the second opening in the moveable cross-dock; and redistributing freight to the fourth freight container via the at least three openings of the moveable cross-dock.

According to another aspect, there is provided a moveable cross-dock for the redistribution of freight between freight containers, the moveable cross-dock comprising: a first moveable cross-dock section having at least two wheels enabling rolling movement of the first moveable cross-dock section, and a first body supported by the at least two wheels of the first moveable cross-dock section; a second moveable cross-dock section having at least two wheels enabling rolling movement of the second platform, and a second body supported by the at least two wheels of the first moveable cross-dock section; a coupling mechanism to releasably secure the first moveable cross-dock section to the second moveable cross-dock section so that the first body and the second body enclose an interior storage area; a first opening in one of the first body and the second body through which freight may be moved into and out of the interior storage area; and a second opening in one of the first body and the second body through which freight may be moved into and out of the interior storage area.

At least one of the first body and the second body can have a compressible seal positioned between the first body and the second body when the first moveable cross-dock section is secured to the second moveable cross-dock section.

At least one of the first body and the second body can be shiftable laterally relative to the at least two wheels of the first moveable cross-dock section and the second moveable cross-dock section respectively.

The moveable cross-dock can further include a lateral shifting assembly on at least one of the first moveable cross-dock section and the second moveable cross-dock section that can selectively shift the at least one of the first moveable cross-dock section and the second moveable cross-dock section towards the other of the first moveable cross-dock section and the second moveable cross-dock section.

The moveable cross-dock can further include a weighing station within at least one of the first moveable cross-dock section and the second moveable cross-dock section configured to weigh freight positioned thereon.

At least one of the first moveable cross-dock section and the second moveable cross-dock section can further include a set of one or more lock boxes having interiors that are accessible at least from the interior storage area.

The interiors of the lock boxes can be accessible from an exterior of the moveable cross-dock sections when the first moveable cross-dock section is secured to the second moveable cross-dock section.

BRIEF DESCRIPTIONS OF THE DRAWINGS

For a better understanding of the various embodiments described herein and to show more clearly how they may be carried into effect, reference will now be made, by way of example only, to the accompanying drawings in which.

Figure 6:
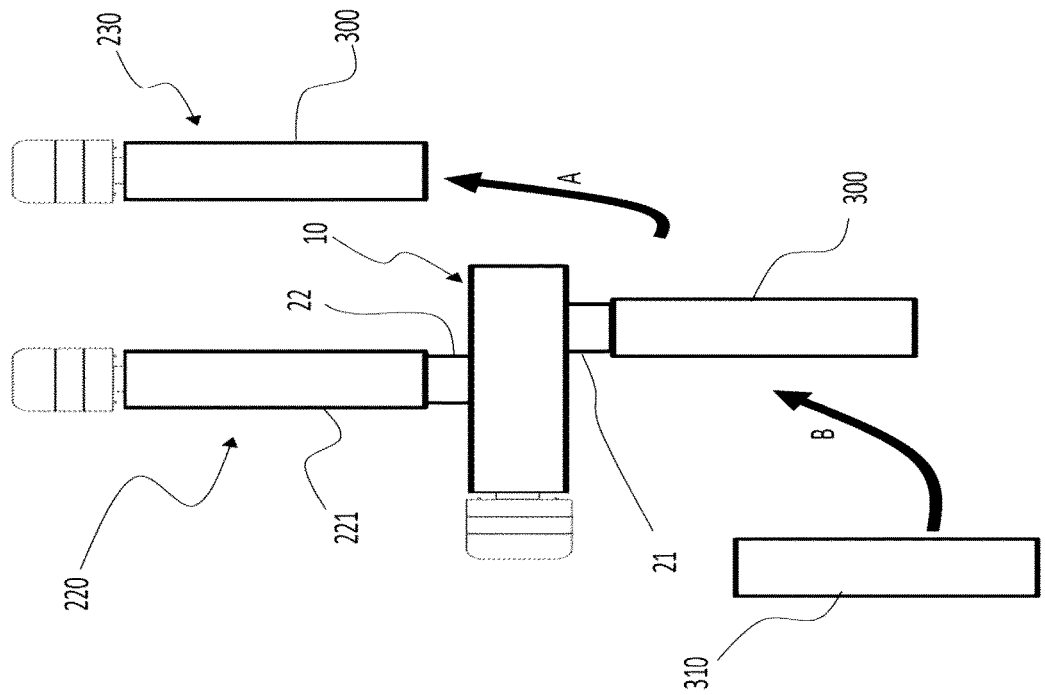
Figure 5:
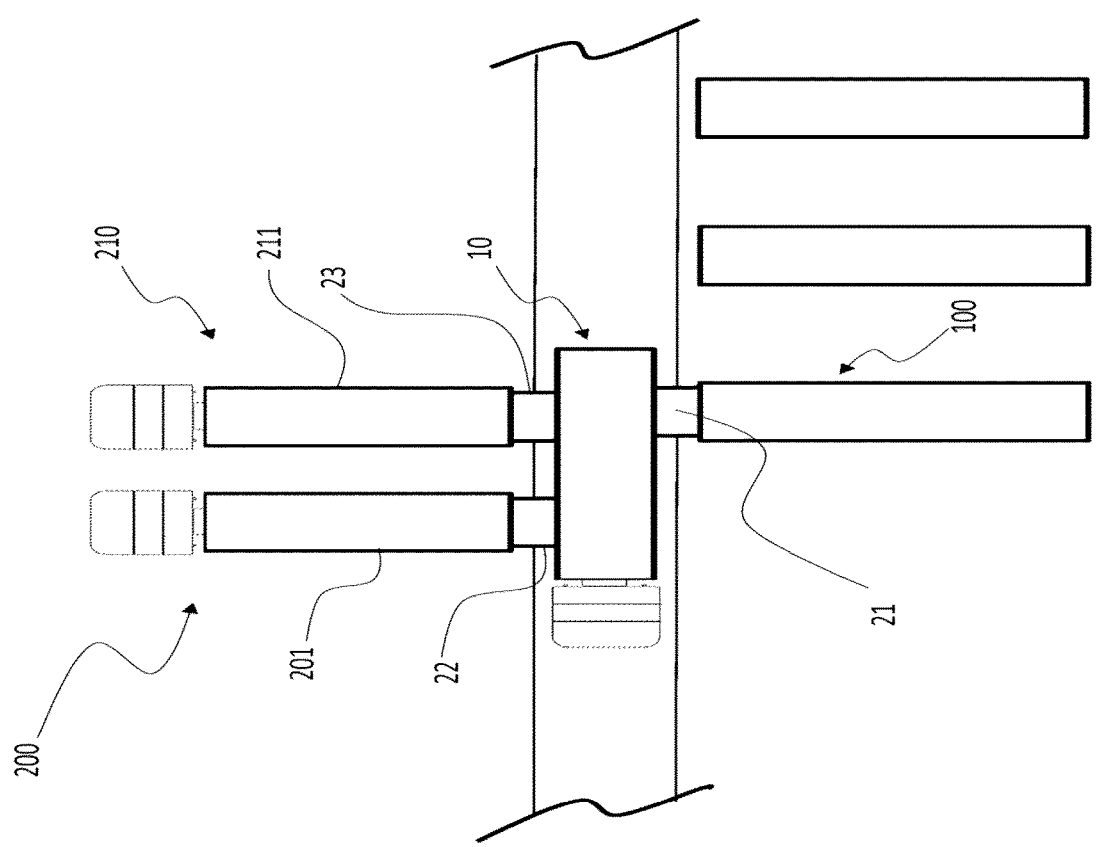
Figure 7B:
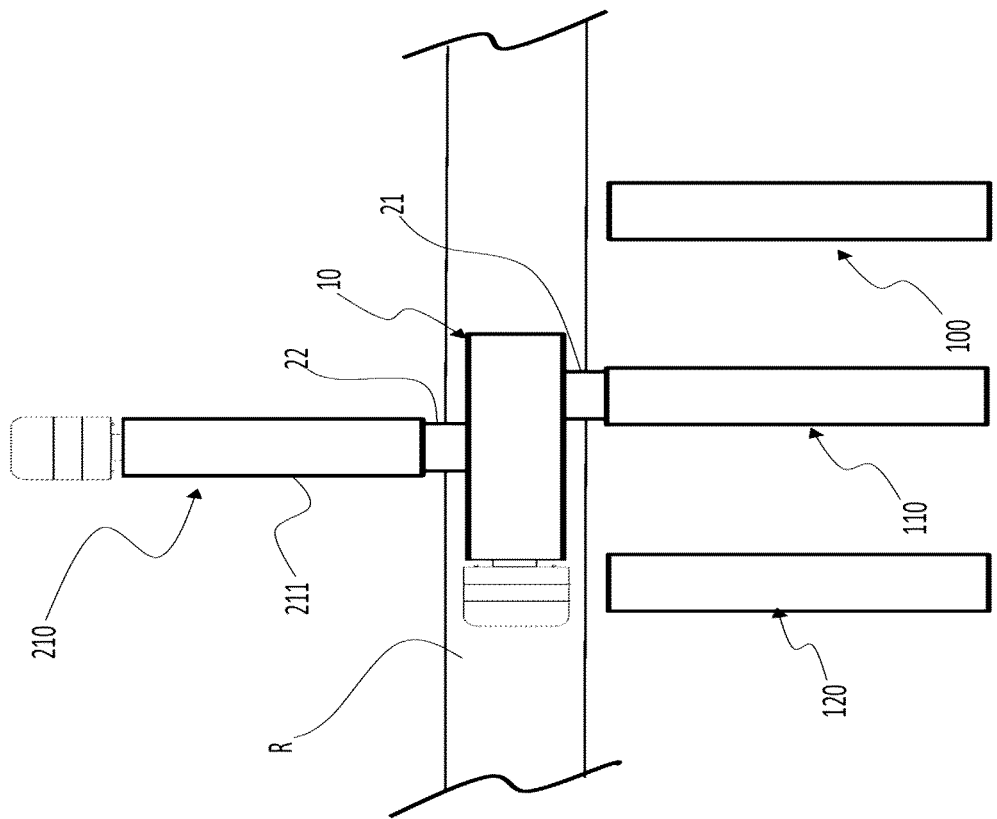
Figure 7A:
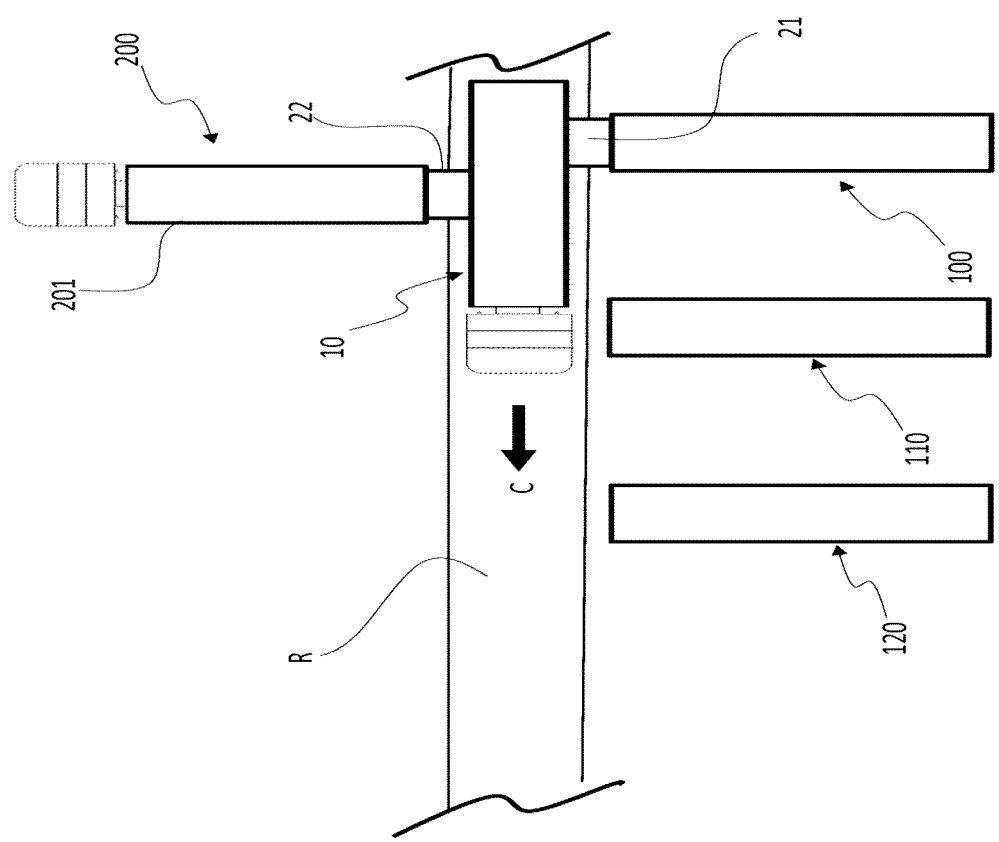
Figure 8A:
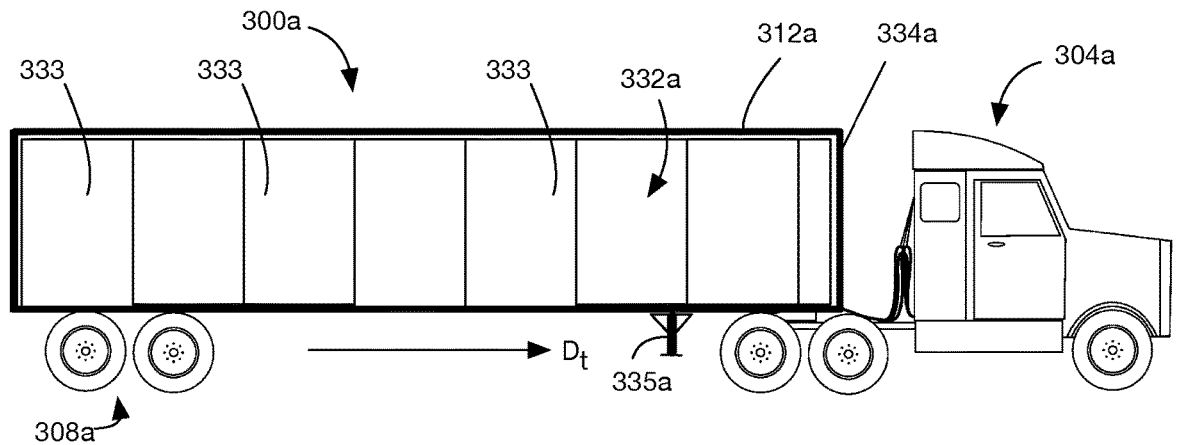
Figure 8B:
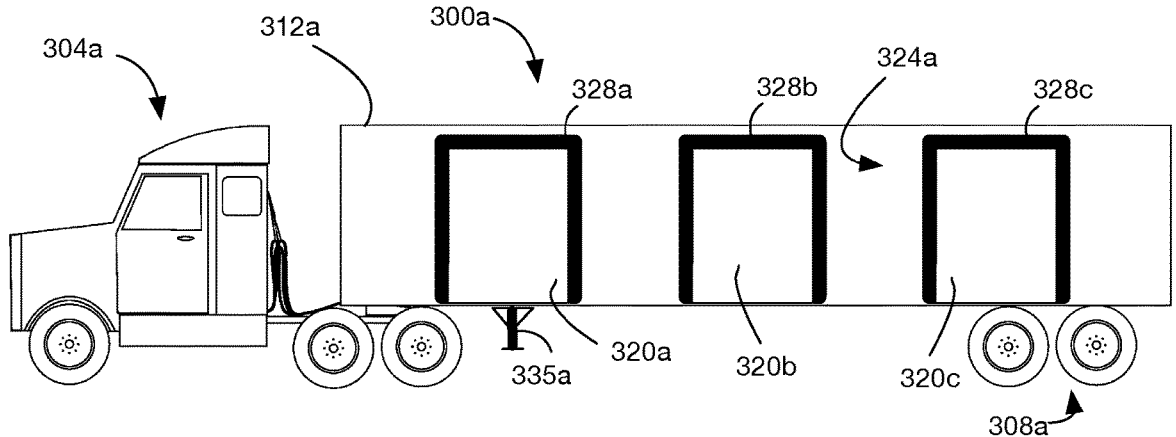
Figure 8C:
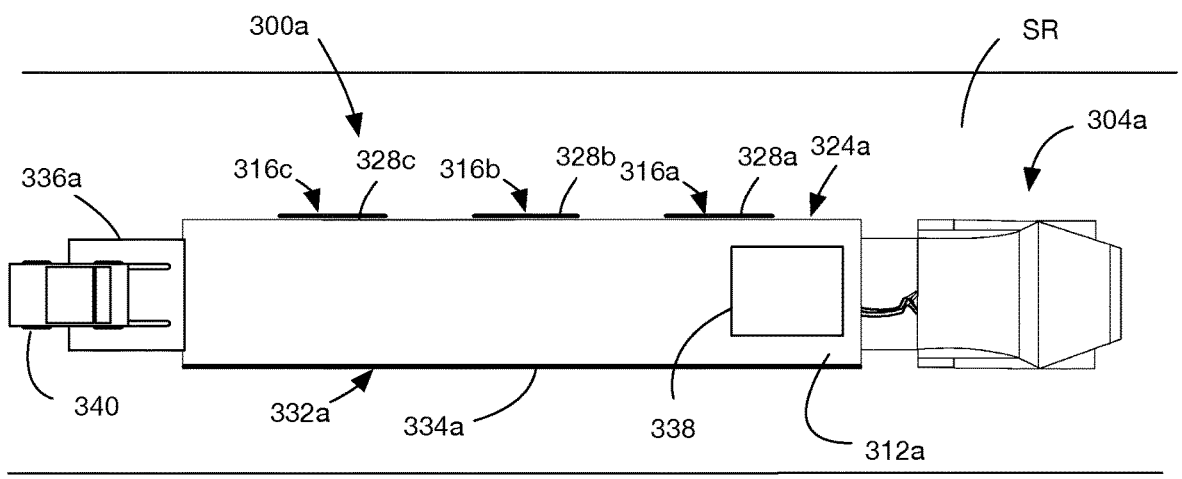
Figure 8D:
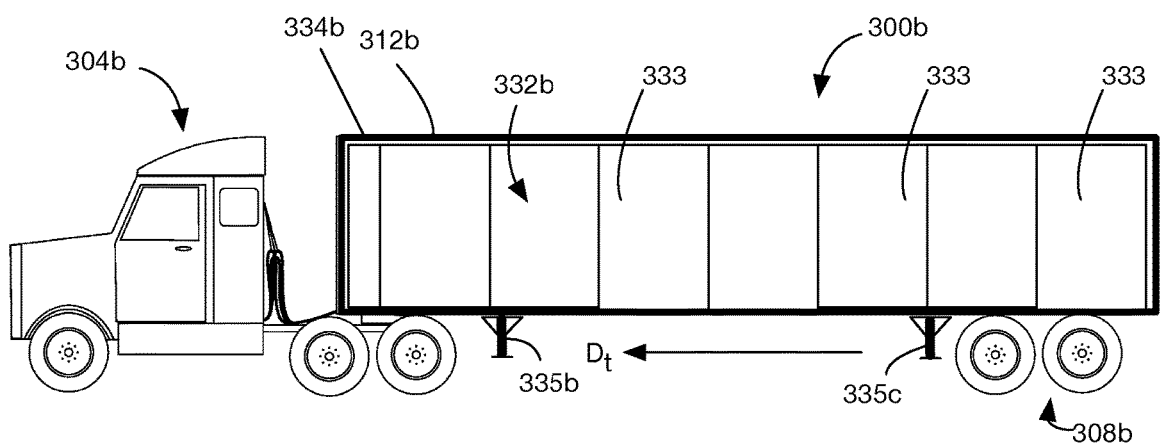
Figure 8E:
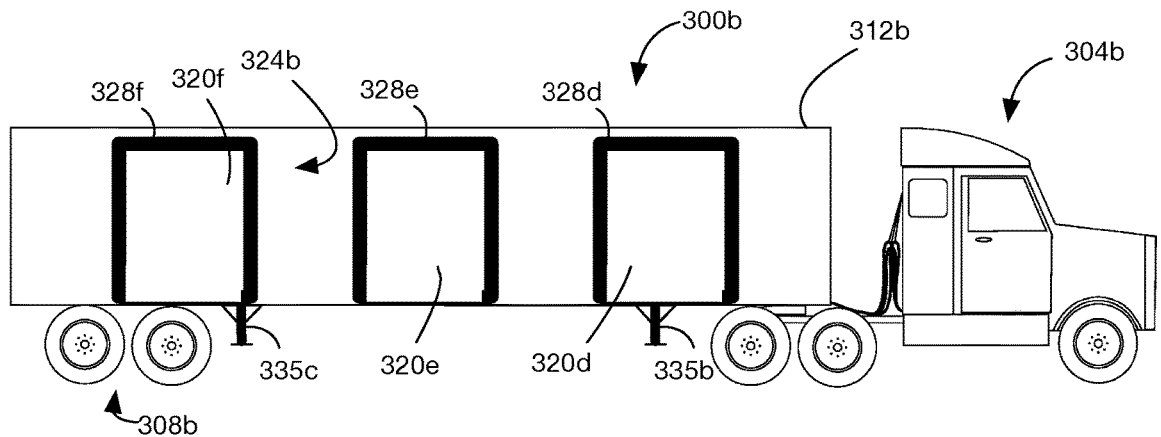
Figure 8F:
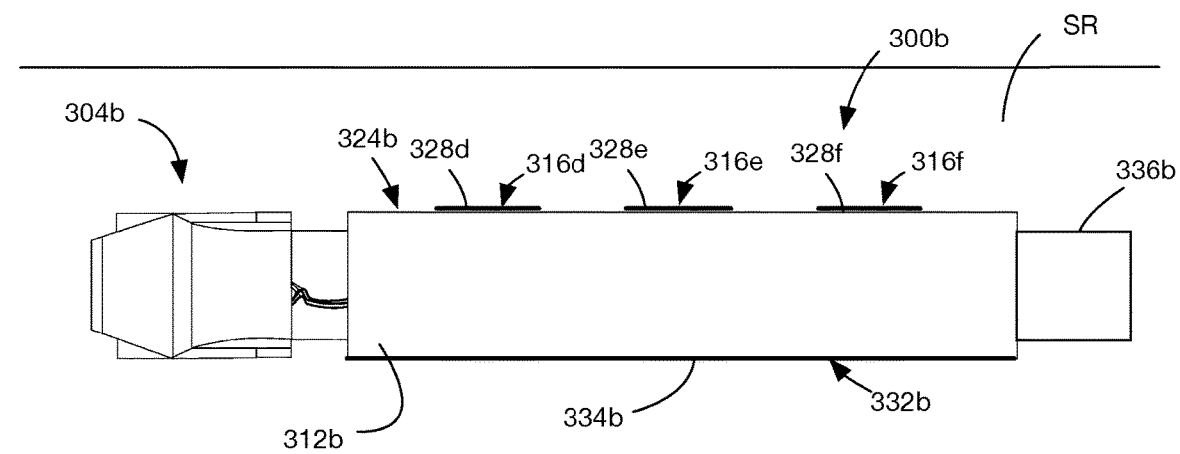
Figure 9A:
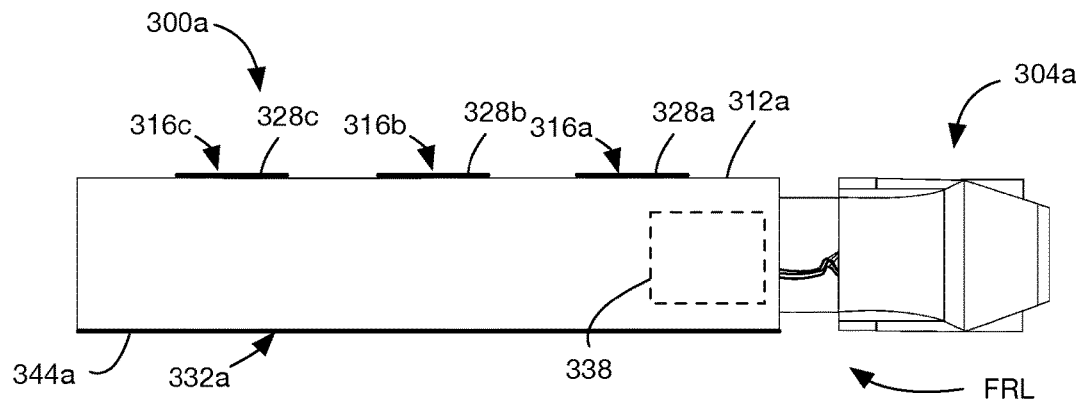
Figure 9B:
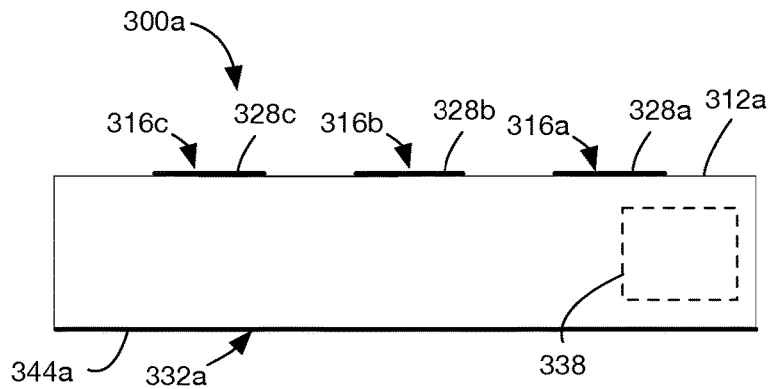
Figure 9C:
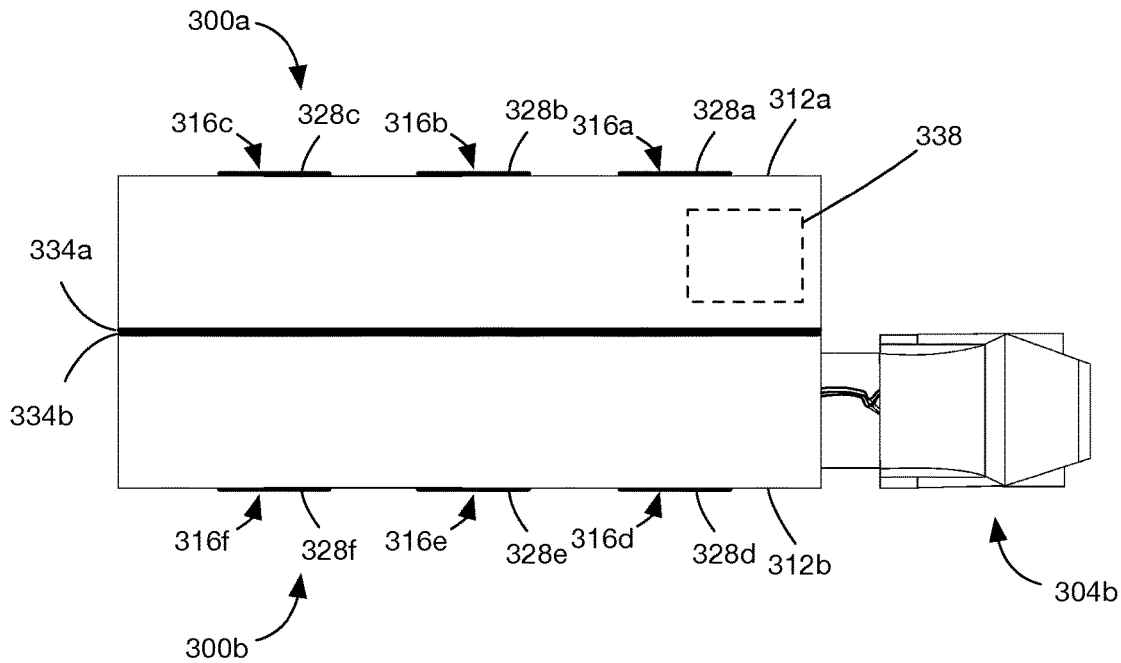
Figure 9D:
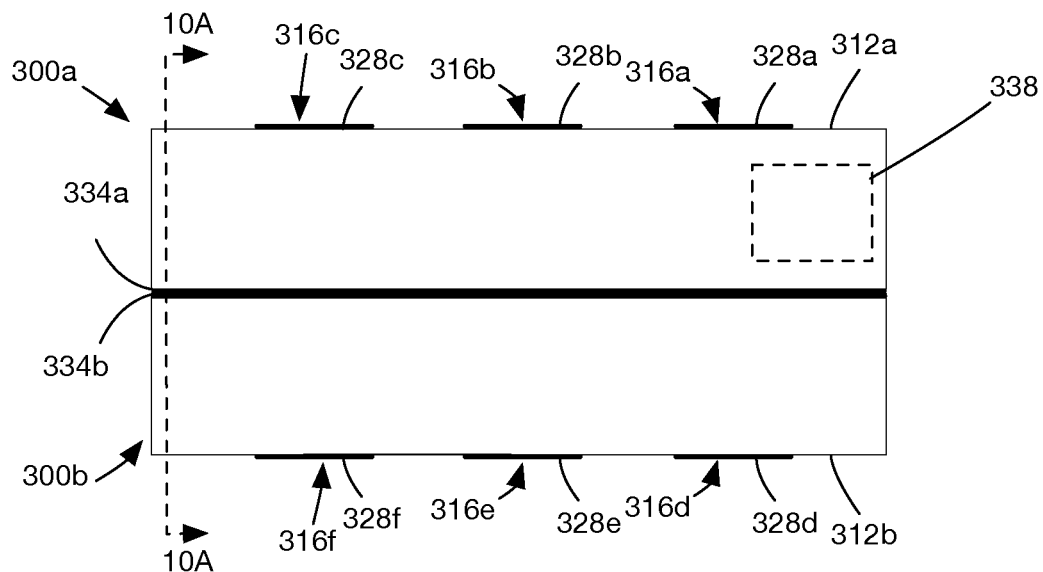
Figure 10A:
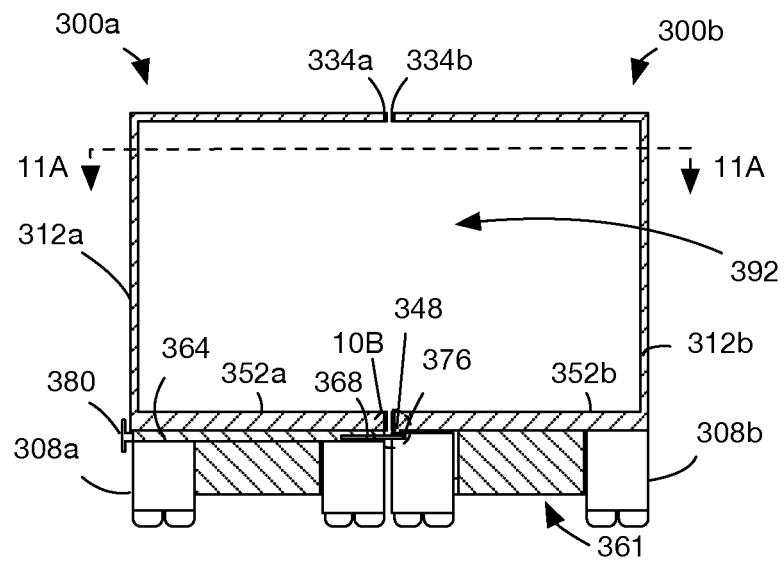
Figure 10B:
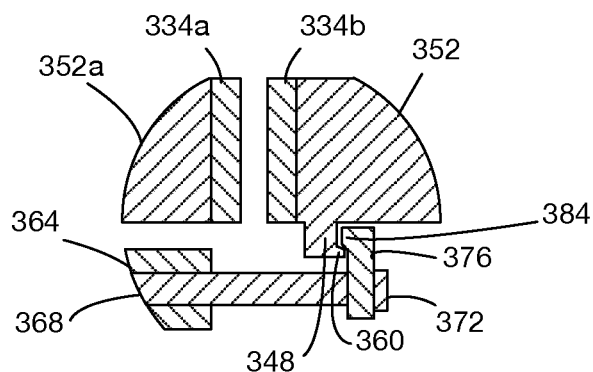
Figure 11A:
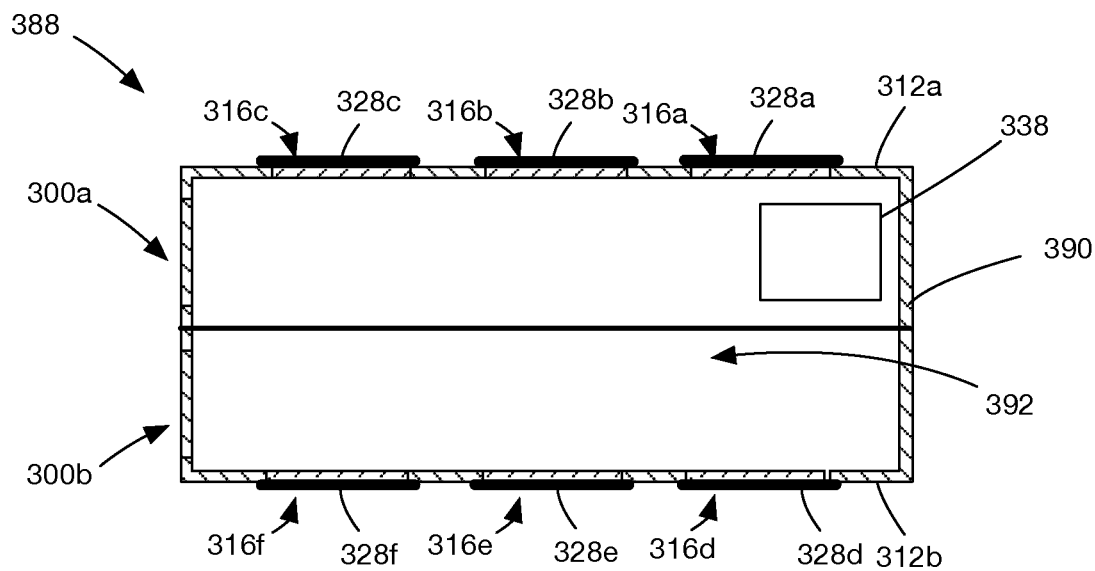
Figure 11B:
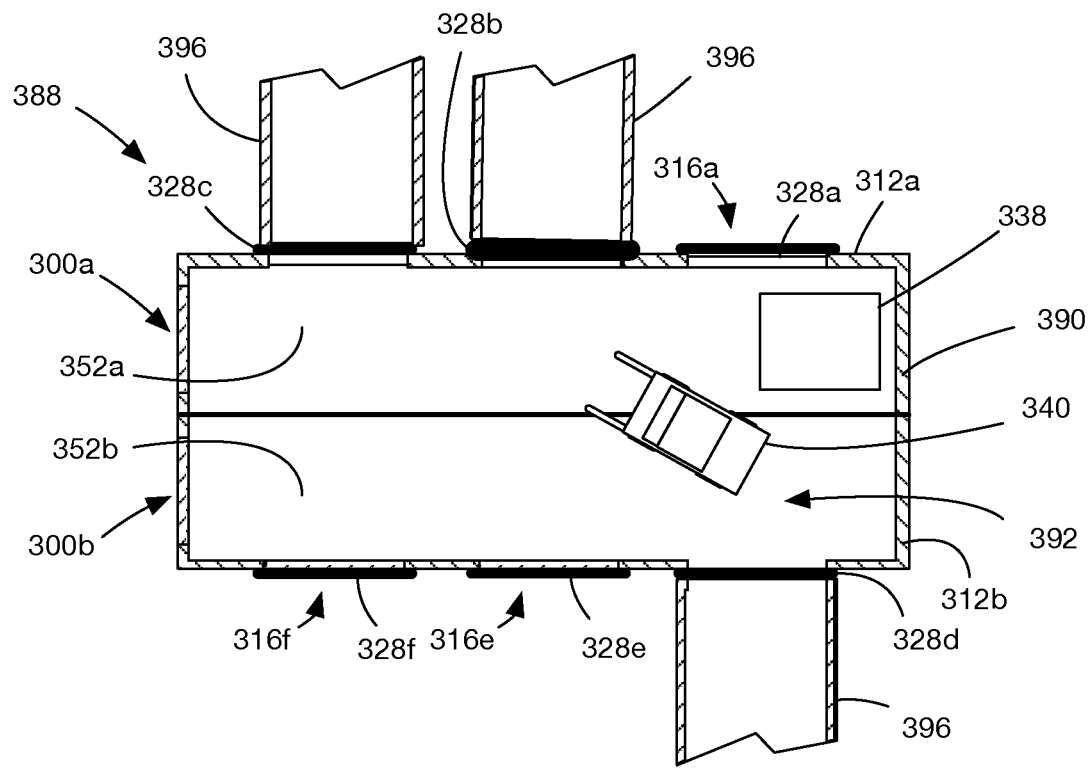
Figure 12A:
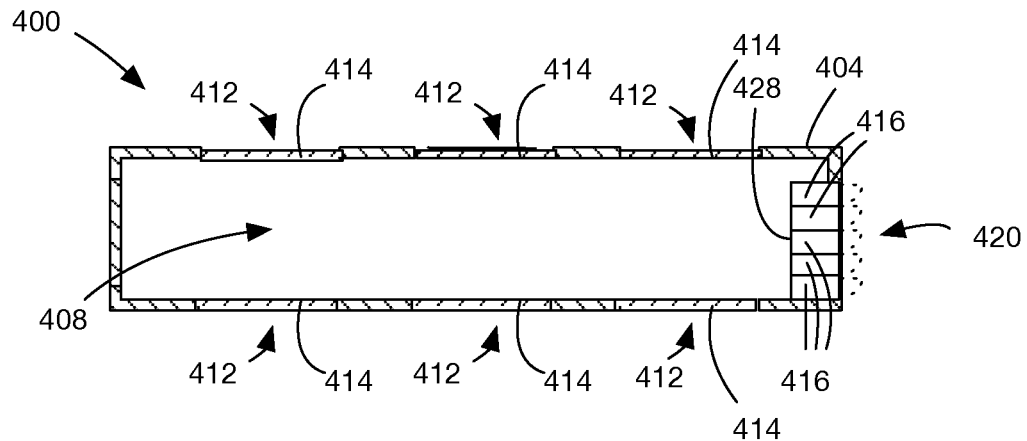
Figure 12B:
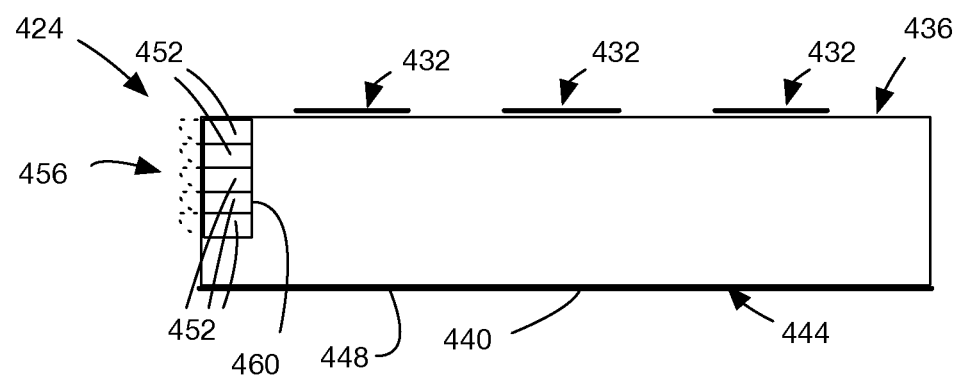

FIGS. 4A to 4D are schematic, cut-away representations of a container, a surface-road transport, and the cross-dock of the present invention, each depicting a step in an exemplary process of distributing freight from the container to the surface-road transport via the cross-dock (though, as noted in the written description, the process may also be conducted in reverse—i.e., from the surface-road transport to the container);

FIG. 5 shows an alternative method of simultaneously distributing freight between a container and two surface-road transports via the cross-dock of the present invention;

FIG. 6 shows an alternative method of distributing freight between a container and a surface-road transport via the cross-dock of the present invention;

FIGS. 7A to 7B show an alternative method of distributing freight between successive containers and one or more surface-road transports via the cross-dock of the present invention;

FIGS. 8A to 8C show a first moveable cross-dock section coupled to a truck for transportation in accordance with an embodiment;

FIGS. 8D to 8F show a second moveable cross-dock section coupled to a truck for transportation for use in conjunction with the first moveable cross-dock section of FIGS. 8A to 8C;

FIGS. 9A to 9D show the positioning of the first and second moveable cross-dock sections adjacent one another at a freight redistribution location;

FIG. 10A is a front section view of the first moveable cross-dock section positioned adjacent the second moveable cross-dock section along line 10A-10A in FIG. 9D;

FIG. 10B is a partial section view of a coupling mechanism used to couple the two moveable cross-dock sections of FIG. 10A with reference to line 10B;

FIG. 11A is a top section view of the first moveable cross-dock section secured to the second moveable cross-dock section to form a moveable cross-dock along line 11A-11A in FIG. 10B;

FIG. 11B is a top section view of the moveable cross-dock of FIG. 11A with two trailers positioned adjacent to two openings in the moveable cross-dock;

FIG. 12A shows a moveable cross-dock in accordance with another embodiment having a set of lock boxes that are accessible both from an interior and an exterior thereof; and FIG. 12B shows a moveable cross-dock section in accordance with a further embodiment having a set of lock boxes that are accessible both from an interior and an exterior thereof.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

As used herein, the word "freight" is intended to refer to any freight which may be transported via ship, rail and surface road, including perishable and non-perishable freight of any and all kinds. It will be appreciated that such freight as comprehended by this specification may be packaged in any conventional fashion, and may or may not be palletized.

As used herein, the term "surface-road transport" is, unless otherwise specified, intended to comprehend any vehicle adapted to ship freight via surface road, including, without limitation, trucks (i.e., with fixed freight storage containers), semitrailers (i.e., with selectively removable freight storage containers), container or flatbed trucks (i.e., semis with a chassis adapted to carry a freight container, such as, for instance, an intermodal shipping container), etc. The term "freight container," in turn, means and refers to any container that can be/is transported via surface-road transport, whether fixed to the surface road vehicle (such as a transport trailer) or removable (whether comprising a trailer or a chassis supporting an intermodal container, etc.). Unless otherwise specified, the term "surface-road transport" comprehends in its meaning a "freight container" portion that is conveyed by the surface-road transport.

As used herein, the term "prime mover" means and refers to any motorized vehicle capable of towing or otherwise moving the moveable cross-dock according to one embodiment disclosed herein. Without limitation, a prime mover may comprise a semi-truck, a truck, a tractor, etc.

As used herein, the phrase "maximum lawful surface-road transportation weight," or similar variants thereof, means the maximum permissible weight, as defined by any law, regulation or other prohibition, of a surface-road vehicle (inclusive of the freight carried thereby—i.e., the gross weight) travelling on the surface roads of any one or more jurisdictions (e.g., country, state, etc.) through which freight carried by the surface-road vehicle is transported. Similarly, the phrase "no more than the maximum weight that can be lawfully carried via surface-road transportation of the intermodal shipping container," or similar variants thereof, means the maximum permissible weight, as defined by any law, regulation or other prohibition, of a surface-road vehicle (inclusive of the intermodal shipping container and freight contained therein) travelling on the surface roads of any one or more jurisdictions (e.g., country, state, etc.) through which the intermodal shipping container carried by the surface-road vehicle is transported. Similarly, the phrase "maximum weight that can be lawfully carried in the freight container of the at least first surface-road transport," or similar variants thereof, means the maximum permissible weight, as defined by any law, regulation or other prohibition, of a surface-road vehicle (inclusive of the freight container and freight contained therein—i.e., the gross weight) travelling on the surface roads of any one or more jurisdictions (e.g., country, state, etc.) through which the freight container carried by the surface-road vehicle is transported.

As used herein, the terms "containers" and "freight containers" mean, unless otherwise specified, any freight container including, without limitation, both intermodal shipping containers, the freight containers (such as the transport trailers) of surface-road transports, and rail-borne freight containers. As used herein, the term "rail-borne freight containers" means and refers to any freight container moved by rail, including, without limitation, both intermodal shipping containers as well as boxcars and the like.

With reference being had also to the drawings, the present disclosure may be better understood.

Turning first to FIGS. 1A to 1D and 4A to 4D, there is shown in an exemplary embodiment a moveable cross-dock 10 for bridging the distribution of freight between freight containers and surface-road transports. The moveable cross-dock 10 comprises a body 11 defining an interior storage area 12 (see FIGS. 4A to 4D) and at least first 13 and second 14 openings in the body through which freight may be moved into and out of the storage area, and a plurality of wheels 20 configured to enable selective movement of the body 11.

According to the embodiment of FIGS. 1A to 1D, the body 11 will be seen to include two openings 14, 15 on one side thereof and a single opening 13 on the opposite side. It will be understood from this disclosure, however, that the body 11 may have one or more openings on each side thereof. For instance, there is shown in FIGS. 2A to 2C a variant form of the cross-dock 10' having two openings 13', 14', 15', 16' per side, as well as an access ramp 26' of the type described further below.

Figure 1A:
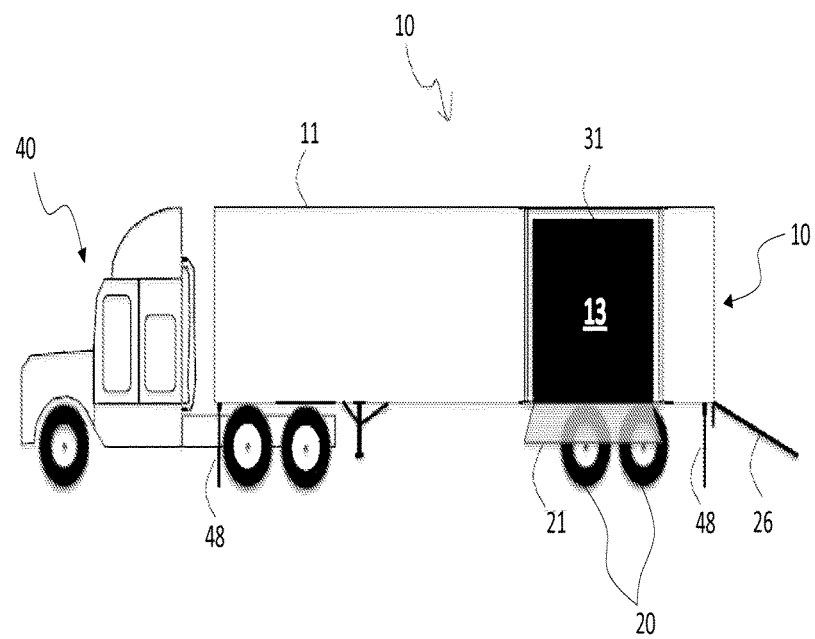
FIG. 1A is a lateral elevational view of a movable cross-dock according to a first embodiment of the invention.
Figure 1B:
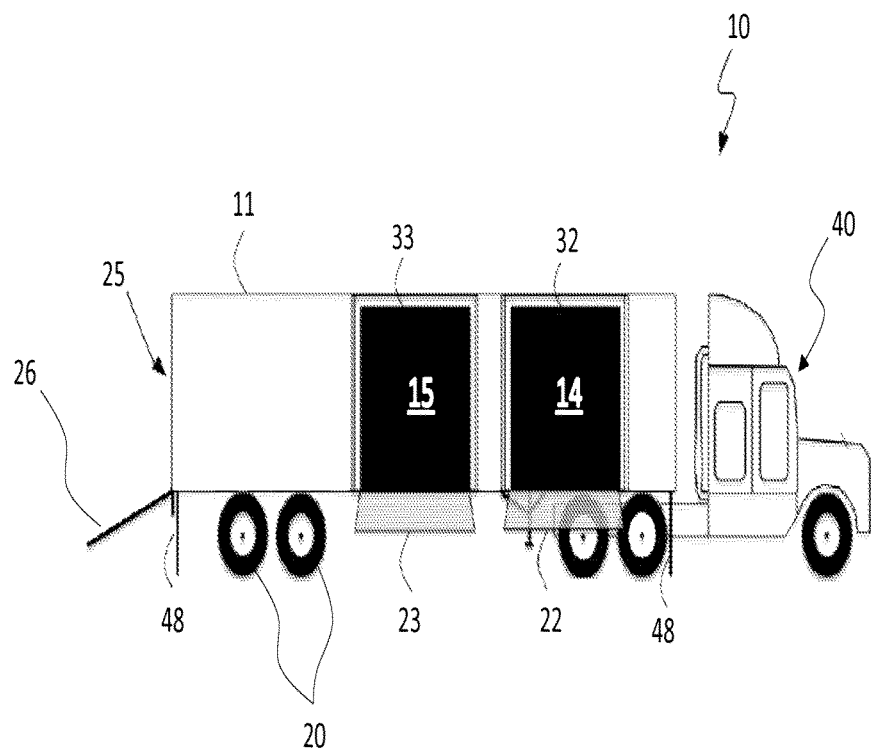
FIG. 1B is an opposite lateral elevational view of a movable cross-dock according to the embodiment of FIG. 1A.
Figure 1C:
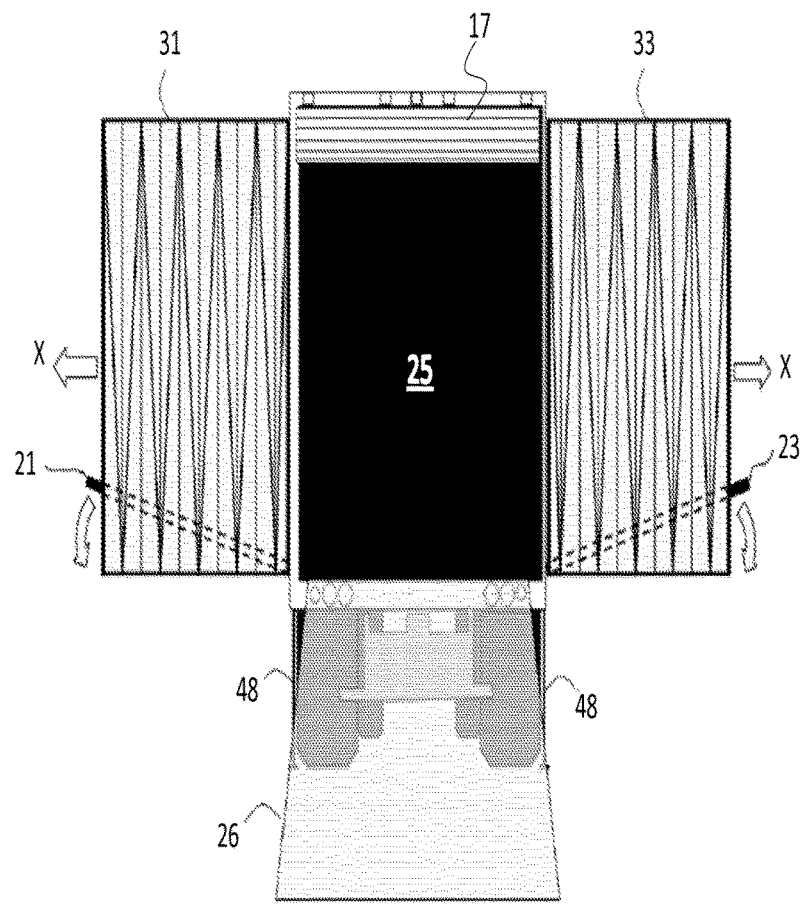
FIG. 1C is a rear elevational view of the movable cross-dock of FIG. 1A.
Figure 1D:
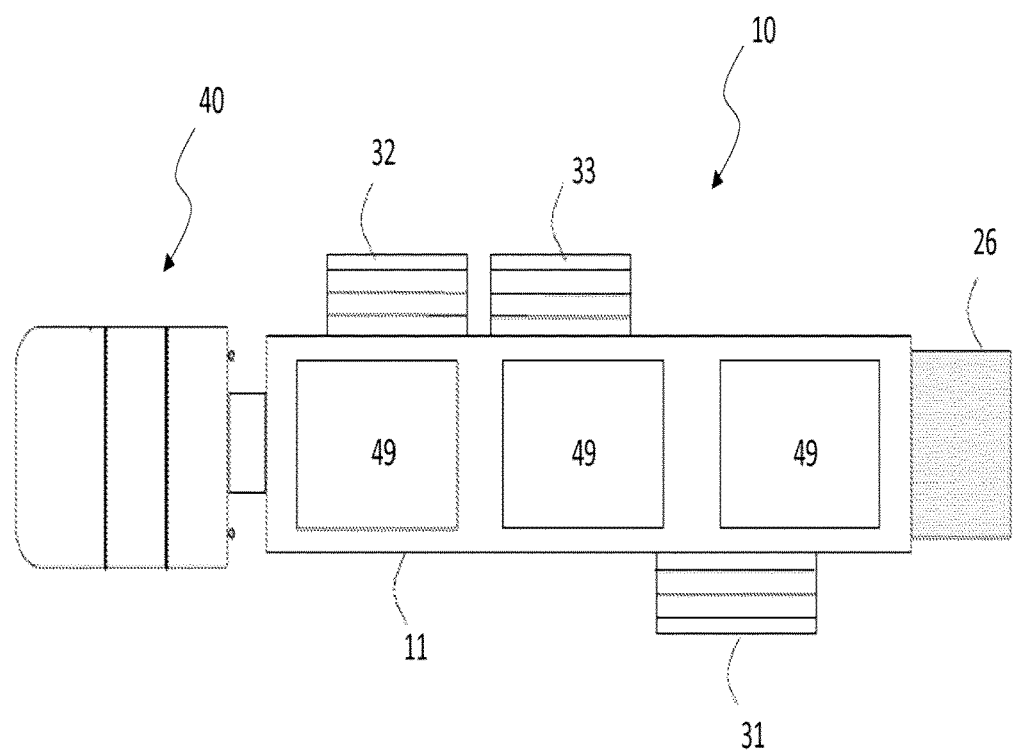
FIG. 1D is a top-down view of the movable cross-dock of FIG. 1A.
Figure 2A:
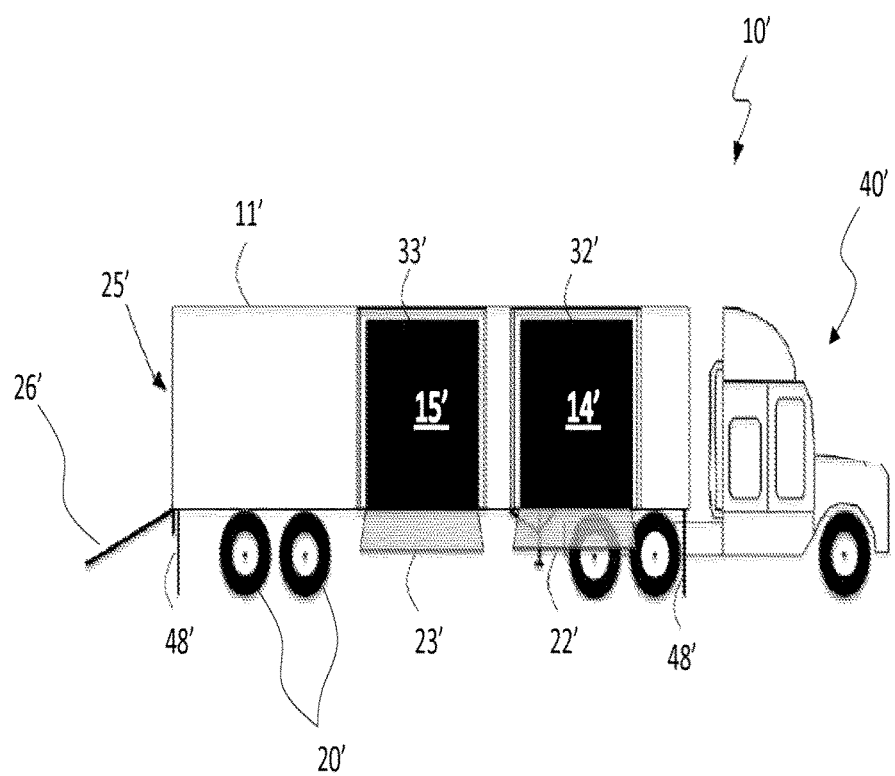
FIG. 2A is a lateral elevational view of a movable cross-dock according to a second embodiment of the invention.
Figure 2B:
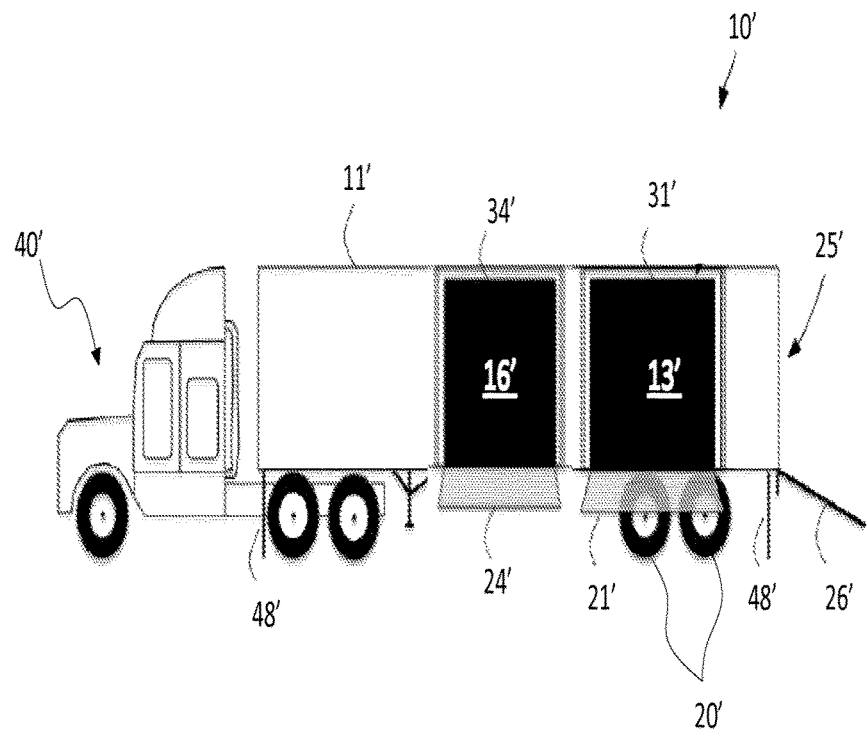
FIG. 2B is an opposite lateral elevational view of the movable cross-dock of FIG. 2A.
Figure 2C:
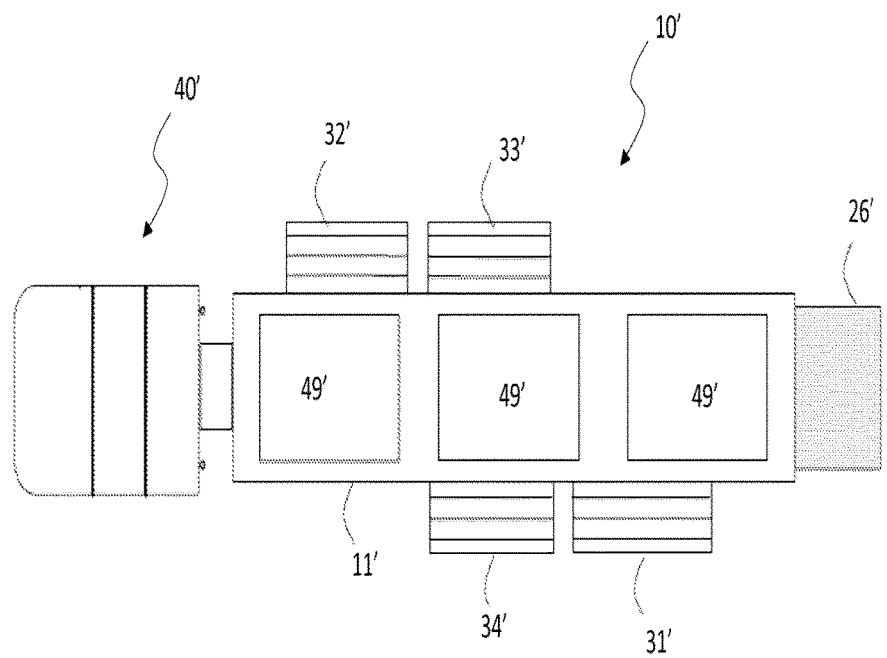
FIG. 2C is a top-down view of the movable cross-dock of FIG. 2A.
Figure 3:
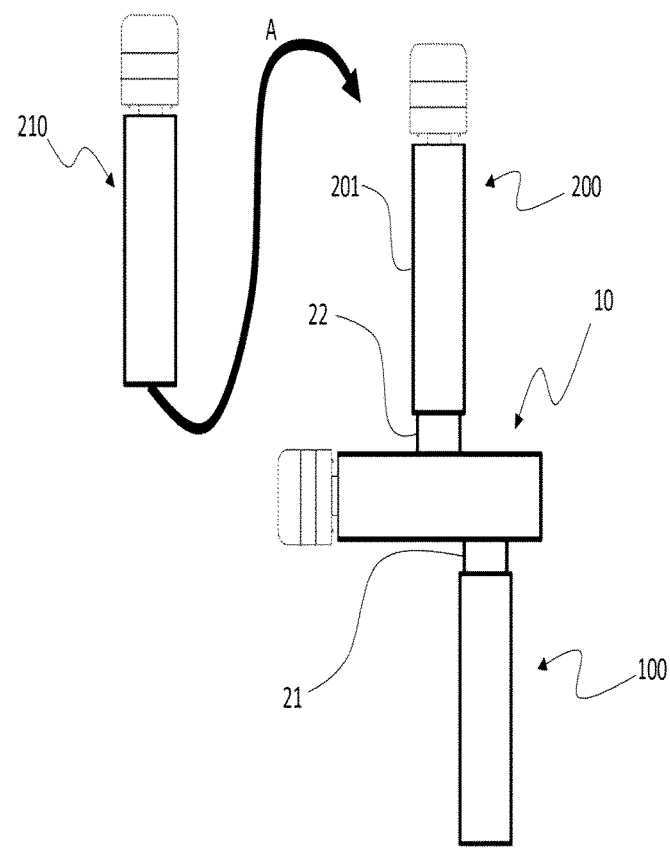
FIG. 3 shows the general method of distributing freight between a container and a surface-road transport via the cross-dock of the present invention.
Figure 4B:
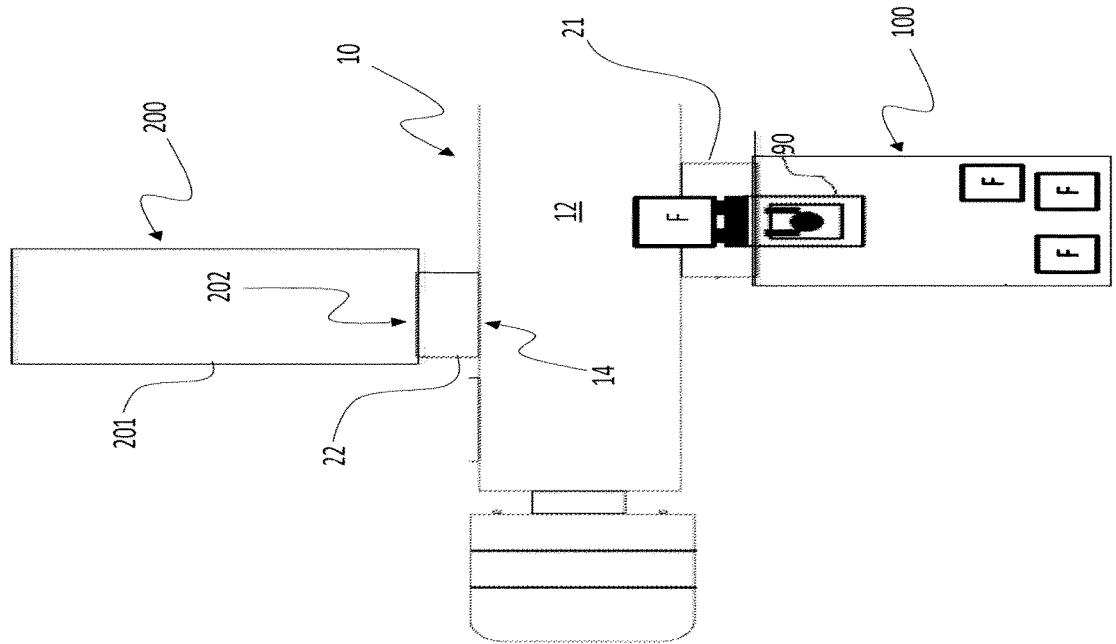
Figure 4A:
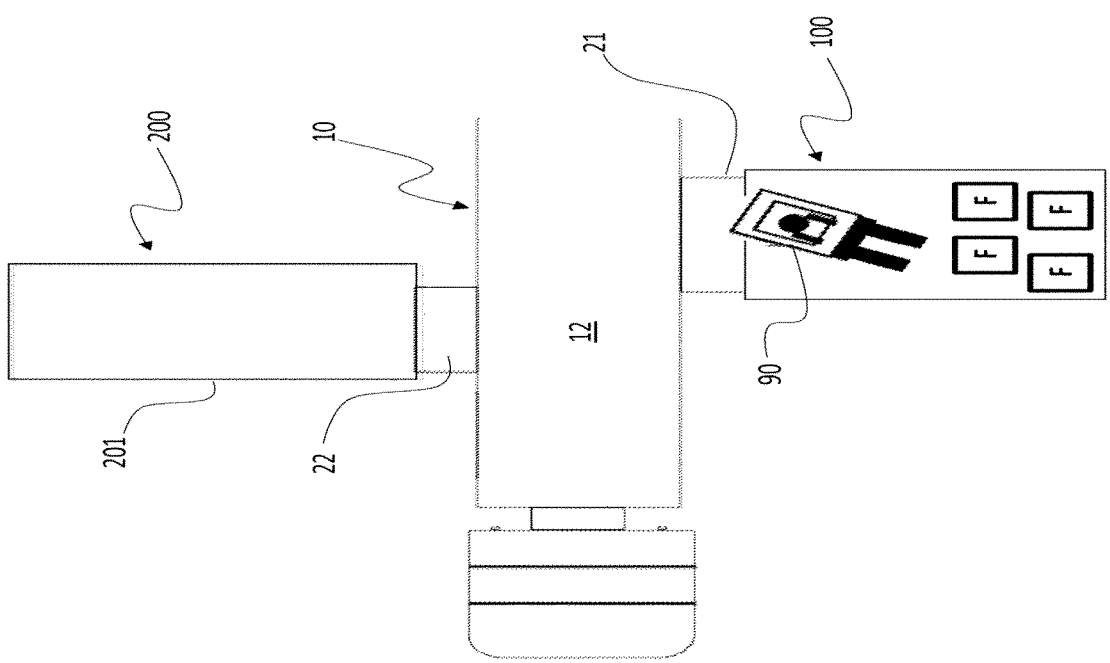
Figure 4C:
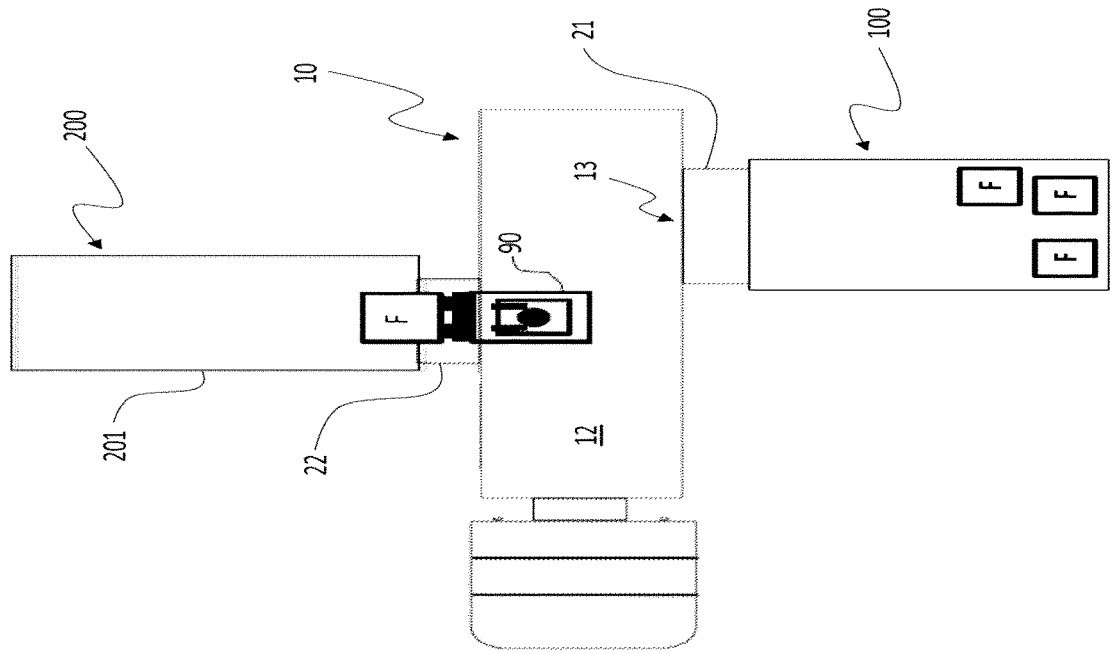
Figure 4D:
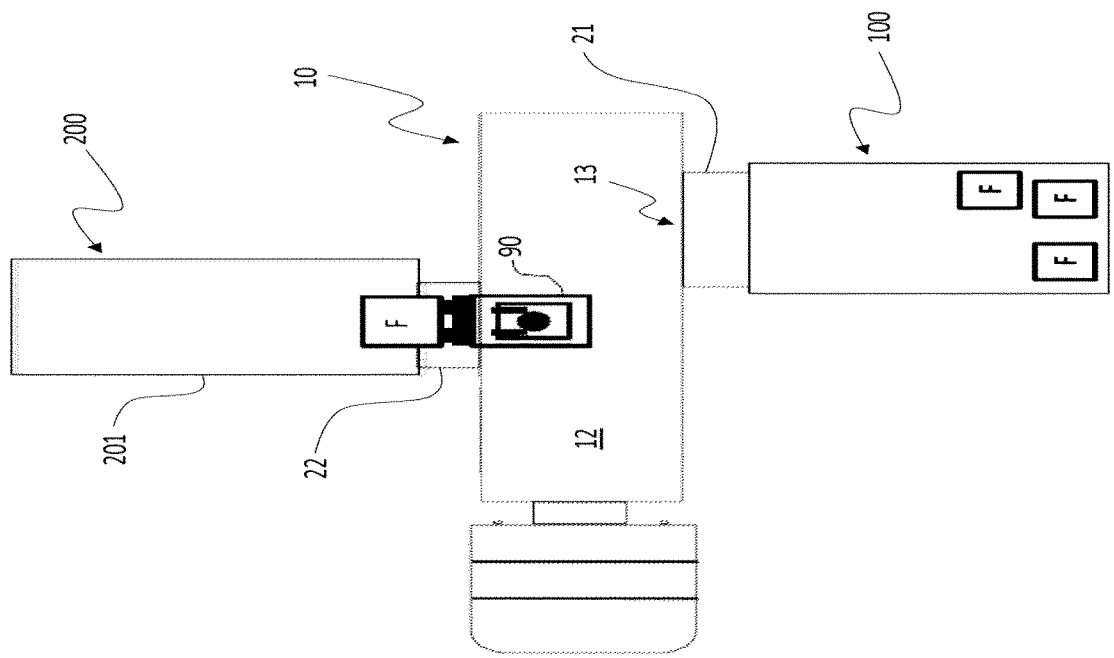

As shown best in FIGS. 1A to 1C, a first loading ramp 21 is extendable from the body proximate one of the at least first 13 and second 14 openings in the body 11. As described further below, the first loading ramp 21 is configured to connect to a first freight container (not shown in FIGS. 1A to 1C) when the first loading ramp is aligned with an opening of the first freight container.

A second loading ramp 22 is extendable from the body 11 proximate the other of the at least first 13 and second 14 openings, the second loading ramp 22 configured to connect to the freight container of a first surface-road transport (not shown in FIGS. 1A to 1D) when the second loading ramp is aligned with an opening of the freight container of the first surface-road transport.

Additionally, there is shown a rear opening 25 with an optional access ramp 26 extendible therefrom. Access ramp 26 may extend to the ground or other support surface to enable a freight-moving vehicle, such as a forklift, by way of non-limiting example, to be driven into the storage area 12.

As best shown in FIG. 1C, each opening (in FIG. 1C, only rear opening 25 is depicted) preferably, though not necessarily, includes a closure (labelled 17 for rear opening 25). Such closures are particularly desirable when the cross-dock body comprises a temperature-controlled storage area, as it will be desirable to seal the storage area to maintain the requisite interior temperature. Each such closure may be of conventional design and construction and may comprise, for instance, one or more hinged doors, one or more doors which slide across the exterior surface of the body adjacent the associated opening (e.g., like a railroad boxcar door) or, as illustrated, a roll-up/roll-down door. Preferably, though not necessarily, it is desirable that the closures take up a minimum of space when opened.

Also according to the illustrated embodiment, each opening 13, 14, 15, etc. and its associated loading ramp 21, 22, 23, etc. is surrounded by a selectively extendible (away from the body 11 in the direction of the arrows X in FIG. 1C) loading tunnel 31, 32, 33 (32 is not visible in FIG. 1C), respectively, each such tunnel forming a substantially sealed passageway between the body 11 and the adjacent freight containers. The extendible loading tunnels 31, 32, 33 protect from weather conditions and provide a substantially sealed environment between the body 11 and the adjacent freight containers.

To facilitate the distribution of freight that is perishable, the interior storage area 12 may optionally be climate-controlled, by any conventional means suitable to the purpose, for maintaining freight at a desired temperature during distribution. This allows the cross-dock to optionally be used for handling freight such as produce, meat, frozen food items and/or other perishable freight. The cross-dock 10 can also serve as a climate-controlled terminal for the temporary storage of perishable freight. The cross-dock 10 according to this optional configuration is thus suited to applications where perishable freight (such as, by way of non-limiting example, palletized and/or floor loaded food products/time sensitive commodities and freight shipped in refrigerated or freezer freight containers and transferred to refrigerated/freezer trailers equipped with self-contained refrigeration equipment) requires one or two days of on-site storage prior to delivery off-site, and does not need conventional warehousing storage prior to delivery by surface-road transport.

Still referring to FIGS. 1A to 1D, the cross-dock 10 is shown as comprising a wheeled trailer that is configured to be selectively coupled to a prime mover, such as the illustrated semi-truck 40, to facilitate the selective movement of the cross-dock 10. The means for connecting the cross-dock body 11 to the prime mover may be any of the various types known in the art. Alternatively, the cross-dock may comprise means for its own locomotion. For instance, the cross-dock may comprise a truck integral with the body 11.

Adjustable support legs 48 extendible downwardly from the corners of the body 11 permit the body to be maintained at a desired height; e.g., a height that is substantially equal to the height of the floor of the freight containers to which the cross-dock is connected. In practice, adjustable support legs 48 are extended when the cross-dock is no longer supported by the semi-truck 40 at its front end.

As shown in the embodiments of each of FIGS. 1A to 1D and 2A to 2C, one or more transparent or translucent panels 49, 49' may optionally be provided in the roof of the body 11, 11' to assist with visibility in the interior storage area 12, 12'.

Accessory equipment may also be added to the moveable cross dock 10. For example, the accessory equipment may include live floors, robotic arms, etc. (not illustrated). In these cases, it may be possible to move freight between freight containers without the use of a forklift or with at least reduced reliance on a forklift.

As manifest from this specification, the moveable cross-dock 10 of the present invention has utility at terminals of the type where freight is distributed between freight containers and surface-road transports, including intermodal terminals, shipyards, and/or rail-yard terminals. The method of utilizing the moveable cross-dock in such environments will now be discussed with reference to FIGS. 3 and 4A to 4D, in connection with which drawings (and the related written description) the method of the present invention is exemplified in connection with the distribution of freight between intermodal shipping containers (whether transported by rail or ship) and surface-road transports. It will be appreciated from the following discussion how the inventive method may easily be employed to facilitate the distribution of freight between surface-road transports and freight containers other than intermodal shipping containers.

More specifically, the exemplary method of distributing freight between intermodal shipping containers and surface-road transports fundamentally comprises the steps of: Providing a selectively moveable cross-dock 10 such as heretofore described; positioning a first intermodal shipping container 100 containing freight proximate one of the at least first 13 and second 14 openings in the moveable cross-dock; positioning a first surface-road transport 200 proximate the other of the at least first 13 and second 14 openings in the moveable cross-dock, the first surface-road transport including a freight container 201; and distributing freight between the first intermodal shipping container 100 and the freight container 201 of the first surface-road transport via the at least first 13 and second 14 openings of the moveable cross-dock and loading/unloading openings 101, 202 of the intermodal shipping container and freight container, respectively.

Further according to the illustrated embodiment of FIGS. 3 and 4A to 4D, the intermodal shipping container contains freight having a collective weight in excess of the maximum weight that can be lawfully carried in the freight container of the at least first surface-road transport. As will be appreciated from the remainder of this disclosure, this disposition of freight in the intermodal shipping container is facilitated by the present invention's ability to permit such freight to be distributed to one or more surface-road vehicles in a manner which permits each such surface-road vehicle to transport the freight via surface-roads without violating the weight restrictions that may be applicable in any one or more jurisdictions through which the surface-road vehicles transport the freight.

Still more particularly, and with continuing reference to the exemplary method of FIGS. 3 and 4A to 4D, the moveable cross-dock 10 is positioned perpendicular to the intermodal shipping container 100 and the access ramp 22 of the cross-dock 10 is aligned with a freight unloading/loading opening 101 of the intermodal freight container. The access ramp 22 is connected to the rail-borne freight container so that it can bear load. As may be required, the retractable loading tunnel 32 is extended towards the opening 101 of the intermodal shipping container and creates a seal around it.

Next, the freight container 201 of a surface-road transport 200 is aligned with the opening 13 and backed into position. The loading ramp 21 is then connected to the loading/unloading opening 202 of the freight container 201. As may be required, the retractable loading tunnel 31 is extended towards the opening 202 of the freight container and creates a seal around it.

Freight may then be distributed from the intermodal shipping container 100, through the interior storage area 12 of the moveable cross-dock 10, and into the freight container 201 of the surface-road transport 200 via the loading ramps 21, 22. This process is exemplified in FIGS. 4A to 4D, wherein the process of moving freight F by forklift 90 from the interior of the intermodal shipping container 100 to the interior of the freight container 201 via the interior storage area 12 of the cross-dock 10 is depicted.

To ensure that the surface-road vehicle 200 can lawfully move along the roads of all jurisdictions (e.g., states, countries, etc.) through which it may travel in the transportation of the freight, distribution of the freight between the first intermodal shipping container 100 and the freight container 201 of the at least first surface-road transport via the cross-dock 10 does not continue beyond the point at which the collective weight of all freight in the freight container 201 would cause the surface road transport 200 to exceed the maximum lawful surface-road transportation weight.

The process of loading an intermodal shipping container with freight from the freight container of a surface-road transport is essentially the same as described above, except that the distribution of freight is reversed; i.e., freight is distributed from the freight container of the surface-road transport to the intermodal shipping container. By way of example and without limitation, it will be appreciated by those skilled in the art that the reverse steps of the above-described method may be implemented where it is desired to combine the freight of one, two or even more surface-road transports into a single intermodal shipping container for subsequent conveyance by rail or ship. While each surface-road transport might be prohibited by applicable weight restrictions from individually carrying so much freight, less restrictive weight restrictions applicable to freight transport by rail or ship would favor the economy of consolidating the freight from multiple surface-road transports into a single intermodal shipping container for rail or ship transportation.

Once a desired amount of freight has been distributed between the intermodal shipping container 100 and the surface-road transport 200, the freight container 211 of a second surface-road transport 210 may be aligned with the loading ramp 21 and backed into position (represented schematically by the arrow A of FIG. 3) so that additional freight from the intermodal shipping container 100 may be distributed to the freight container 211 of the surface-road transport 210. That process may be repeated with third and subsequent surface-road transports as necessary or desired.

Alternatively, and as shown in the embodiment of FIGS. 1A to 1D and 5, the cross-dock 10 of the present invention may comprise a sufficient number of openings 12, 13, 14 and loading ramps 21, 22, 23 to facilitate the simultaneous distribution of freight between an intermodal freight container 100 and the freight containers 201, 211 of two or more surface-road vehicles 200, 210. As will be appreciated, the distribution of freight between the intermodal freight container and the two or more freight containers 201, 211 of two or more surface-road vehicles occurs essentially as described heretofore; and, once the desired amount of freight has been distributed between the intermodal freight container and the freight containers 201, 211, additional surface-road transports may, as necessary, be positioned proximate the cross-dock 10 (also essentially as described heretofore) in place of those into which freight has already been distributed.

As will be appreciated, the various freight within the intermodal freight container may be distributed to the freight containers of different surface-road transports, since such freight may be going to different end destinations, need different treatments (for instance, some freight may require refrigeration while other freight may not), and/or have otherwise different logistical issues which necessitate different treatment. The moveable cross-dock of the present invention allows for an efficient transfer of freight between intermodal freight container and the freight containers of surface-road transports and, since there can be a plurality of transport trailers aligned with the various openings of the moveable cross dock at the same time, sorting of freight can take place in real time while the freight is being distributed. In one implementation, the distribution of freight may be facilitated by providing an indication, via, for instance, an inventory list, tagging system, etc., of which freight container of which surface-road transport freight should be loaded into. Rather than sorting freight and then distributing it to particular freight containers one at a time, the moveable cross-dock according to the present invention thus allows for the sorting and distribution of the freight into one of a plurality of potential freight containers to occur simultaneously.

Referring now to FIG. 6, it will be understood that, where the freight container comprises an intermodal shipping container 300, the method of the present invention comprehends that the shipping container 300 may itself be transferred (indicated by the arrow A) to the chassis of a surface-road transport 230 after a desired amount of freight has been distributed between intermodal shipping container 300 and the freight container 221 of at least a first surface-road vehicle 220. Indeed, it will be understood that this utilization of the present invention permits the intermodal shipping container to be filled to capacity for travel by rail, and the freight then distributed amongst one or more freight containers of surface-road vehicles before the intermodal freight container is itself reduced in weight to a point where it can be transported by a surface-road vehicle in compliance with applicable load restrictions for surface-road transportation. In other words, the distribution of freight from the intermodal shipping container to the one or more surface-road vehicles continues to at least the point at which the collective weight of all freight in the intermodal shipping container is no more than the maximum weight that can lawfully carried via surface-road transportation of the intermodal shipping container.

With continuing reference to FIG. 6, it will also be appreciated that, after a desired amount of freight has been distributed between shipping container 300 and the freight container 221 of at least a first surface-road vehicle 220, and the intermodal shipping container 300 is transferred to the chassis of a surface-road transport 230, another intermodal shipping container 310 may be positioned (indicated by the arrow B) proximate the cross-dock 10 so that additional freight may be distributed to one or more additional surface-road transports (not depicted) and/or to the freight container 221 of at least a first surface-road vehicle 210.

Referring next to FIGS. 7A to 7B, it is also contemplated that the moveable cross-dock 10 may be positioned so as to be moveable relative to a plurality of coupled freight containers—including, for instance, the freight containers of a train, a plurality of adjacently-disposed intermodal shipping containers, etc.—thereby facilitating the more rapid distribution of freight from among several freight containers to one or more surface-road transports. To this end, the moveable cross-dock is positioned adjacent to a first freight container (in the illustrated embodiment, an intermodal shipping container) 100 and the opening 13 of the cross-dock 10 is aligned with a loading/unloading opening 101 of the intermodal shipping container 100. FIG. 7A. The access ramp 21 is connected to the intermodal shipping container so that it can bear load. As may be required, the retractable loading tunnel 31 is extended towards the opening of the intermodal shipping container and creates a seal around it.

Next, the freight container 201 of a surface-road transport 200 is aligned with the opening 14 and backed into position. The loading ramp 22 is then connected to the rear loading/unloading opening 202 of the freight container 201. As may be required, the retractable loading tunnel 32 is extended towards the opening of the freight container and creates a seal around it.

Once a desired amount of freight has been distributed between the intermodal shipping container 100 and the surface-road transport 200, the surface-road transport is moved away from the cross-dock 10. Next, the cross-dock 10 is moved (indicated by the arrow C) along a path parallel to the length of the train and into position proximate a second intermodal shipping container 110. The opening 13 of the cross-dock 10 is aligned with a loading/unloading opening 111 of the intermodal shipping container and the loading ramp 21 connected to the intermodal shipping container so that it can bear load. Again, as may be required, the retractable loading tunnel 31 is extended towards the opening of the intermodal shipping container and creates a seal around it. The same or another surface-road transport 210 is then aligned with the opening 13, backed into position, and the loading ramp 22 connected to the rear loading/unloading opening 212 of the freight container 211 so that freight from the second intermodal shipping container 110 may be distributed to the freight container 211 of the surface-road transport 210.

By continuing to move the cross-dock 10 relative to the several intermodal shipping containers (or vice-versa), the foregoing process may be repeated with a third 120 and subsequent intermodal shipping containers as necessary or desired.

Movement of the cross-dock may be facilitated by the provision of a paved service road R (FIGS. 7A to 7B) running parallel to the intermodal shipping containers or, where the freight containers comprise rail-borne freight containers, the cross-dock may be provided with rail wheels and the path of travel parallel to the train may be defined by railroad tracks disposed in parallel to the tracks on which the train is disposed.

The use of the moveable cross-dock of the present invention has a number of advantages over conventional depot loading and unloading. Particularly where the freight containers comprise intermodal freight containers, the full weight capacity of each intermodal shipping container can be utilized for ship and/or rail travel (which is typically the longest stretch of the shipping journey). This can realize from 25% to 50% increase in the freight load for the intermodal freight container as compared to conventional loading practices which, as noted elsewhere, may oblige intermodal freight containers to be under-loaded so that they are weight compliant with various restrictions on surface-road loads when it comes to the surface-road portion of the shipping journey. As each intermodal freight container can carry more freight, fewer intermodal freight containers need be employed to transport the same amount of freight via ship and/or rail.

Further, the moveable cross-dock of the present invention can be used to rejig the load of freight between surface-road transports or even the load within a freight container. This use of the moveable cross-dock as a temporary storage site can also reduce wait times as freight can be unloaded from a surface-road transport, allowing the surface-road transport to be taken from the rail yard, intermodal terminal, etc. and repurposed before the arrival of the freight container into which the freight is transferred from the moveable cross-dock where it is being stored.

Still further, the cross-dock of the present invention is moveable and, thus, can be redeployed at different locations—such as, by way of non-limiting example, different rail yards, shipyards, intermodal terminals, warehousing yards, parking lots, etc.—as needed.

In some scenarios, it can be desirable to provide temporary, secure storage via a moveable cross-dock. For example, when a load is being distributed from a first freight container to a second freight container, it can be beneficial to enable the first freight container, such as a trailer of a transport truck, to unload, then depart before the second freight container is coupled to the moveable cross-dock. One approach is to couple a separate freight container to one of the openings of a moveable cross-dock and use it to store freight until it can be shifted to another freight container. In some scenarios, however, it may be desirable to be less restricted by the order in which freight was loaded into the freight container coupled to the moveable cross-dock, and in the amount of room available to maneuver within the moveable cross-dock, such as via a forklift. The width of an interior storage area of a moveable cross-dock in accordance with the above embodiments, however, is somewhat limited in some scenarios by road vehicle limitations.

A moveable cross-dock that is formed from two separately-transportable cross-dock segments will now be described with reference to FIGS. 8A to 11B. As the moveable cross-dock is assembled from two cross-dock sections that may be separately transported, the moveable cross-dock is not limited to a width afforded by a single road-transportable component.

FIGS. 8A to 8C show a first moveable cross-dock section 300a coupled to a transport truck 304a for transportation in accordance with an embodiment. A plurality of wheels 308a of the moveable cross-dock section 300a are configured to enable selective movement of the moveable cross-dock section 300a over a surface road SR via the standard road transport truck 304a or via a custom transport vehicle. The mobile cross-dock section 300a may have a standard king pin suitable for connection with a fifth-wheel coupling of a standard road transport truck, such as the transport truck 304a, or other suitable coupling device. A body 312a is at least partially supported by the plurality of wheels 308. The body 312a can be constructed of a sheet metal skin stretched over a frame, panels of corrugated metal or another suitable material, etc., and is sufficiently rigid to resist deformation during transportation and coupling as will be described. Insulation may be provided for the body 312a in some scenarios, such as where a climate-controlled environment is desired.

The body 312a has three openings 316a, 316b, 316c (which may be referred to as opening(s) 316) in the body 312a along a first lateral side 324a (relative to a primary direction of travel $D_t$ of the moveable cross-dock section 300a) of the body 312a. Each of the openings 316 is dimensioned to generally correspond to the dimensions of a loading/unloading opening of a freight container, such as, for example, a transport trailer. Each of the openings 316a, 316b, 316c is covered by a removable door 320a, 320b, 320c respectively. The removable doors 320a, 320b, 320c are designed to seal the openings 316a, 316b, 316c and may be insulated, where climate-control is desired. Further, the removable doors 320a, 320b, 320c can be securable within the openings 316a, 316b, 316c to prevent unauthorized access to an interior of the body 312a.

A loading tunnel 328a, 328b, 328c surrounds each of the openings 316a, 316b, 316c respectively and is selectively extendible laterally away from the body 312a. The loading tunnels 328a, 328b, 328c may be selectively coupleable to the body 312a and removable for transportation of the moveable cross-dock section 300a.

A second lateral side 332a includes a plurality of removable panels 333 constructed of plywood or another suitable material and secured to a frame of the body 312a. The removable panels 333 enclose an interior of the body 312a.

A sealing gasket 334a extends around the periphery of the second lateral side 332a. The sealing gasket 334a is made of a resilient compressible material, such as, for example, rubber.

A pair of support legs 335a extend adjustably from an undersurface of the body 312a to support the body 312a in a horizontal position when the transport truck 304a is withdrawn.

A loading ramp 336a may be provided to facilitate the loading of a forklift 340, as shown in FIG. 8C into the body 312a of the moveable cross-dock 300a for transportation therewith.

A weighing station in the form of a weighing plate 338 is positioned within the body 312a on a floor thereof. The weighing plate 338 is operably coupled to pressure sensors positioned below the weighing plate 338.

FIGS. 8D to 8F show a second moveable cross-dock section 300b coupled to a transport truck 304b for transportation. The second moveable cross-dock section 300b is a companion to the first moveable cross-dock section 300a, as will be explained below. A plurality of wheels 308b of the second moveable cross-dock section 300b are configured to enable selective movement of the second moveable cross-dock section 300b over a surface road via the standard road transport truck 304b or via a custom transport vehicle. The second mobile cross-dock section 300b may have a standard king pin suitable for connection with a fifth-wheel coupling of a standard road transport truck, such as the transport truck 304a. A body 312b is at least partially supported by the plurality of wheels 308b. The body 312b can be constructed of a sheet metal skin stretched over a frame, panels of corrugated metal or another suitable material, etc., and is sufficiently rigid to resist deformation during transportation and coupling as will be described. Insulation may be provided for the body 312*b* in some scenarios, such as where a climate-controlled environment is desired.

The body 312*b* has three openings 316*d*, 316*e*, 316*f* (which may also be referred to as opening(s) 316) in the body 312*b* along a first lateral side (relative to a primary direction of travel D*t* of the second moveable cross-dock section 300*b*) of the body 312*b*. Each of the openings 316 is dimensioned to generally correspond to the dimensions of a loading/unloading opening of a freight container, such as, for example, a transport trailer. Each of the openings 316*d*, 316*e*, 316*f* is covered by a removable door 320*d*, 320*f*, 320*f* respectively. The removable doors 320*d*, 320*e*, 320*f* are designed to seal the openings 316*d*, 316*e*, 316*f* and may be insulated, where climate-control is desired. Further, the removable doors 320*d*, 320*e*, 320*f* can be securable within the openings 316*d*, 316*e*, 316*f* to prevent unauthorized access to an interior of the body 312*b*.

A loading tunnel 324*d*, 324*e*, 324*f* surrounds each of the openings 316*d*, 316*e*, 316*f* respectively and is selectively extendible laterally away from the body 312*b*. The loading tunnels 324*d*, 324*e*, 324*f* may be selectively coupleable to the body 312*b* and removable for transportation of the second moveable cross-dock section 300*b*.

A second lateral side 332*b* includes a plurality of removable panels 333 constructed of plywood or another suitable material and secured to a frame of the body 312*b*. The removable panels 333 enclose an interior of the body 312*b*.

A sealing gasket 334*b* extends around the periphery of the second lateral side 332*b*. The sealing gasket 334*b* is made of a resilient compressible material, such as, for example, rubber.

Two pairs of support legs 335*b*, 335*c* extend adjustably from an undersurface of the body 312*b* to support the body 312*b* in a horizontal position when the transport truck 304*b* is withdrawn. Each of the pairs of support legs 335*b*, 335*c* has a frame plate with a set of laterally elongated slots in which bolts extending downwardly from an underside of the body 312*b* are received and secured via nuts. The frame plates are provided with a plate with a low coefficient of friction to facilitate lateral shifting of the body 312*b* relative to the frame plates.

A loading ramp 336*b* may be provided to facilitate the loading of a forklift into the body 312*b* of the moveable cross-dock 300*b* for transportation therewith.

FIG. 9A shows the positioning of the first moveable cross-dock 300*a* at a freight redistribution location FRL at which the moveable cross-dock is to be deployed. The freight redistribution location FRL is an area that preferably has sufficient space for transportation vehicles to pull up to the moveable cross-dock sections 300*a* and 300*b*, and is surface-road-accessible along at least one lateral side of the first moveable cross-dock 300*a*. The first moveable cross-dock 300*a* is positioned via the transport truck 304*a*.

Upon positioning the first moveable cross-dock section 300*a*, the support legs 335*a* are extended towards the surface upon which the first moveable cross-dock section 300*a* is positioned to fully support the first moveable cross-dock section 300*a* on the surface. The transport truck 304*a* can then be decoupled from the first moveable cross-dock section 300*a*, leaving the first moveable cross-dock 300*a* in its position, as is shown in FIG. 9B.

Once the first moveable cross-dock section 300*a* is positioned at the freight redistribution location FRL, the removable panels 333 are removed from the first moveable cross-dock section 300*a* and the second removable cross-dock section 300*b*, thus exposing the interior of each body 312*a*, 312*b* along the second lateral sides 332*a*, 332*b* thereof respectively. As will be appreciated, the first moveable cross-dock section 300*a* and the second moveable cross-dock section 300*b* are generally mirror images of each other.

The second moveable cross-dock section 308*b* is positioned adjacent to and in similar alignment to the first moveable cross-dock section 308*a*, with the second lateral sides 332*a*, 332*b* of the first and second moveable cross-dock sections 300*a*, 300*b* facing one another, as is shown in FIG. 9C. A driver of the second transport truck 304*b* drives the second transport truck 304*b* to align the second moveable cross-dock section 300*b* as closely as possible to the first moveable cross-dock section 300*a*.

Upon positioning the second moveable cross-dock section 300*b*, the transport truck 304*b* can be decoupled from the second moveable cross-dock section 300*b*, leaving the second moveable cross-dock 300*b* in its position, as is shown in FIG. 9D. The support legs 335*b*, 335*c* are extended towards the surface upon which the second moveable cross-dock section 300*b* is positioned to raise the set of wheels 308*b* of the moveable cross-dock section 300*b* above the surface on which the moveable cross dock section 300*b* rests. The nuts securing the body 312*b* to the support legs 335*b*, 335*c* are loosened to enable lateral movement of the body 312 relative to the support legs.

FIGS. 10A and 10B show one of a set of coupling mechanisms for securing the first moveable cross-dock section 300*a* to the second moveable cross-dock section 300*b*. The coupling mechanisms are spaced along the longitudinal length of the first moveable cross-dock section 300*a* and the second moveable cross-dock section 300*b*. The coupling mechanism includes a flange 348 extending vertically from an undersurface of a floor 352*b* of the body 312*b* of the second moveable cross-dock section 300*b*. The flange 348 can extend continuously along a longitudinal length of the body 312*b*, or, alternatively, can be broken along the longitudinal length of the body 312*b*. The flange 348 has a lip 360 that extends away from the plane of the sealing gasket 334*b*.

An internally threaded pipe 364 is rotatably coupled to the first moveable cross-dock section 300*a* under a floor 352*a* of the body 312*b*, extending almost the entire lateral width of the body 312*b*. A threaded bolt 368 having threading corresponding to the internal threading of the internally threaded pipe 364 partially extends from an interior of the internally threaded pipe 364. An enlarged head 372 of a distal end of the threaded bolt 368 inhibits removal of a claw 376 that is freely rotatably mounted on the threaded bolt 368. The enlarged head 372 has features that engage corresponding features of the claw 376 to inhibit rotation of the claw 376 relative to the threaded bolt 368 when the claw 376 positioned adjacent the enlarged head 372. A crank wheel 380 is removably coupled to the internally threaded pipe 364 to rotate it relative to the body 312*a*.

In order to secure the first body 312*a* to the second body 312*b*, for each coupling mechanism, the claw 376 is urged against the enlarged head 372 of the threaded bolt 368 and held, and the crank wheel 380 is coupled to the internally threaded pipe 364 and rotated to position the claw 376 laterally adjacent to the flange 348. As the claw 376 is held against the enlarged head 372 and manually inhibited from rotation, the threaded bolt 368 is pulled into the internally threaded pipe 364. Further turning of the crank wheel 380 while the claw 376 is manually held causes the claw 376 to engage the flange 348. A lip 384 of the claw 376 engages the lip 360 of the flange 348 to inhibit rotation of the claw 376 and the threaded bolt 348 held in fixed orientation relative to the claw 376. Thereafter, continued rotation of the crank wheel 380 causes the claw to pull the flange and, thus, the body 312*b* towards the body 312*a*

This process is repeated for each coupling mechanism until the sealing gasket 334*b* of the body 312*b* is pulled generally into engagement with the sealing gasket 334*a* of the body 312*a*.

Once the second moveable cross-dock section 300*b* is positioned adjacent to and abutting the first moveable cross-dock section 300*a*, the pairs of support legs 335*b*, 335*c* are retracted until the wheels 308*b* support the second moveable cross-dock section 300*b* together with the support legs 335*b*, 335*c*.

FIG. 11A shows a composite moveable cross-dock 388 formed from the first and second moveable cross-dock sections 300*a*, 300*b*, having three openings 316*a*, 316*b*, 316*c* along a first side, and another three openings 316*d*, 316*e*, 316*f* along a second side opposite the first side. With the first moveable cross-deck section 300*a* aligned with and secured to the second moveable cross-dock section 300*b*, and as the sealing gaskets 334*a*, 334*b* are compressible, they create a seal between the body 312*a* and the body 312*b* forming the composite cross-dock 388 with an enclosure 390 enclosing an interior storage area 392. The floors 352*a*, 352*b* are generally co-planar.

FIG. 11B shows three freight containers in the form of transport trailers 396 positioned adjacent to three openings 316*b*, 316*c*, and 316*d* of the composite moveable cross-dock 388. A loading/unloading opening of each of the transport trailers 396 is aligned with the openings 316*b*, 316*c*, and 316*d* respectively, and a corresponding one of the loading tunnels 328*b*, 316*c*, 328*d* is extended to a periphery of a corresponding one of the loading/unloading opening of the transport trailers 396 to seal an interior of each of the transport trailers 396 with the interior storage area 392 of the composite moveable cross-dock 388. The extendible loading tunnels 328*b*, 328*c*, 328*d* protect from weather conditions and provide a substantially sealed environment between the body 11 and the adjacent freight containers.

The forklift 340 can then be employed to redistribute palettes of freight between the three transport trailers 396 via the interior storage area 392 of the enclosure 390 through the openings 316*b*, 316*c*, and 316*d*.

To facilitate the distribution of freight that is perishable, the interior storage area 392 may optionally be climate-controlled via a climate control system provided by one or both of the moveable cross-dock sections 300*a*, 300*b* for maintaining freight at a desired temperature during distribution. This allows the composite moveable cross-dock 388 to optionally be used for handling freight such as produce, meat, frozen food items and/or other perishable freight. The composite moveable cross-dock 388 can also serve as a climate-controlled terminal for the temporary storage of perishable freight. The composite moveable cross-dock 388 according to this optional configuration is thus suited to applications where perishable freight (such as, by way of non-limiting example, palletized and/or floor loaded food products/time sensitive commodities and freight shipped in refrigerated or freezer freight containers and transferred to refrigerated/freezer trailers equipped with self-contained refrigeration equipment) requires one or two days of on-site storage prior to delivery off-site, and does not need conventional warehousing storage prior to delivery by surface road transport or other means, such as drone, etc.

The weighing plate 338 can be employed to determine how much freight has been shifted between the transport trailers 396. For example, the forklift 340 can be driven atop of the weighing plate 338 to determine its weight, then freight can be shifted from a first transport trailer 396 to a second transport trailer 396, with the weight being recorded each time. The weight shifted via the composite moveable cross-dock 388 can be subtracted from the weight of the first transport trailer recorded before the removal of freight therefrom, and added to the weight of the second transport trailer recorded before the addition of freight thereto. In this manner, a relatively precise measurement of the freight borne by the transport trailers 396 after the shifting of freight can be determined.

It will be appreciated that, while two moveable cross-dock sections are used to form a composite moveable cross-dock in the above-described and illustrated embodiment, in other embodiments, three or more moveable cross-dock sections can be provided and used to form a single composite moveable cross-dock.

The moveable cross-dock sections need not be rectangular and may, in other scenarios, be any other shape suitable for transportation and for forming a composite moveable cross-dock. Further, the composite moveable cross-dock need not be rectangular, and may be, for example, hexagonal or any other suitable shape.

While the composite moveable cross-dock has six openings for loading and unloading freight in the above-described and illustrated embodiment, the composite moveable cross-dock can have any number of two or more openings through which freight can be redistributed.

Further, the openings of the composite moveable cross-dock may be distributed in any manner between the moveable cross-dock sections. For example, one moveable cross-dock section can have two openings, and another moveable cross-dock section with which it may be mated may have no openings. Freight may be moved through the composite moveable cross-dock through the two openings of the one moveable cross-dock section.

Still further, the openings of the composite moveable cross-dock may be positioned along any of the exterior walls of the enclosure of the composite moveable cross-dock.

While, in the above-described and illustrated embodiment, each of the moveable cross-dock sections coupled together has a sealing gasket disposed about the periphery of its body, it will be appreciated that only one of the moveable cross dock sections coupled together can have a sealing structure to seal the interior storage area formed by the two bodies.

The moveable cross-dock sections may be provided with mating features to facilitate alignment of the moveable cross-dock sections relative to one another, such as crenelated mating edges.

It can be advantageous to have openings on opposite sides of the moveable cross-docks, as freight containers positioned adjacent to the moveable cross-docks can stabilize the moveable cross-docks when another freight container is positioned against the moveable cross-dock on an opposite side thereof. This also applies to having openings on opposite sides of composite moveable cross-docks.

The openings of one or more of the moveable cross-dock sections need not extend fully along the entire length of the moveable cross-dock sections.

Other coupling mechanisms for securely coupling two or more cross-docks together will occur to those skilled in the art.

The moveable cross-dock and the moveable cross-dock sections can be made to be amphibian to facilitate transportation of the moveable cross-docks and the moveable cross-dock sections to locations that are not easily accessible via surface roads.

A moveable cross-dock section can be equipped with one or more lateral shifting assemblies for shifting the moveable cross-dock section at least laterally. For example, a set of track mechanisms (such as those commonly equipped on heavy construction machinery) can be selectably extendable to engage a surface upon which the cross-dock section rests to shift the moveable cross-dock section at least laterally. The lateral shifting assemblies can be any of a variety of arrangements to facilitate shifting of the moveable cross-dock section laterally across a surface, such as secondary wheels that are aligned transversely relative to the primary wheels of the moveable cross-dock. The lateral shifting assemblies can be controllable to also shift the moveable cross-dock section longitudinally as well.

FIG. 12A shows a moveable cross-dock 400 in accordance with another embodiment thereof. The moveable cross-dock 400 generally is configured to be transported like a transport trailer via a transport truck. A body 404 of the moveable cross-dock 400 defines an interior storage area 408. A set of openings 412 in the body 404 are covered via resealable doors 414 that can be opened to provide access to the interior storage area 408.

A set of lock boxes 416 is positioned along the body 404. The lock boxes 416 have doors 420 that are accessible via an exterior of the body 404 to enable a person to access the contents in the interiors of the lock boxes from the outside of the moveable cross-dock 400. The doors can be secured and openable via a key, a code punched into a keypad, etc. One or more master panels 428 within the body 404 of the moveable cross-dock 400 provide access to all of the lock boxes 416.

Goods can be shifted from a freight container positioned adjacent one of the openings 412 of the moveable cross-dock 400 into one or more of the lock boxes 416 to enable people to retrieve the goods.

Conversely, goods to be shipped can be securely placed by people within the lock boxes 416 and subsequently transferred to a freight container positioned adjacent an opening 412 of the moveable cross-dock 400 so that the goods can be shipped to remote locations.

FIG. 12B shows a moveable cross-dock section 424 having a body 428, a set of openings along a first lateral side 432 of the body 428, and a set of removable panels 440 on a second lateral side 444 of the moveable cross-dock section 424. A compressible seal 448 encircles the peripheral edge of the second lateral side 444.

A set of lock boxes 452 is positioned along the body 428. The lock boxes 452 have doors 456 that are accessible via an exterior of the body 428 to enable a person to access the contents in the interiors of the lock boxes from the outside of the moveable cross-dock section 424. The doors can be secured and openable via a key, a code punched into a keypad, etc. One or more master panels 460 within the body 404 of the moveable cross-dock 400 provide access to all of the lock boxes 416.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A moveable cross-dock for the redistribution of freight between freight containers, the moveable cross-dock comprising:
a first moveable cross-dock section having at least two wheels enabling rolling movement of the first moveable cross-dock section, and a first body supported by the at least two wheels of the first moveable cross-dock section;
a second moveable cross-dock section having at least two wheels enabling rolling movement of the second moveable cross-dock section, and a second body supported by the at least two wheels of the second moveable cross-dock section;
a coupling mechanism to releasably secure the first moveable cross-dock section to the second moveable cross-dock section so that the first body and the second body enclose an interior storage area;
a first opening in one of the first body and the second body through which freight may be moved into and out of the interior storage area;
a second opening in one of the first body and the second body through which freight may be moved into and out of the interior storage area;
a third opening extending along approximately the entire length of a first long lateral side of the first body; and
a fourth opening extending along approximately the entire length of a second long lateral side of the second body; the third opening and fourth opening aligning when the first moveable cross-dock section is coupled to the second moveable cross-dock section.

2. A moveable cross-dock according to claim 1, wherein at least one of the first body and the second body has a compressible seal positioned between the first body and the second body and substantially entirely surrounding at least one of the third opening and the fourth opening when the first moveable cross-dock section is secured to the second moveable cross-dock section.

3. A moveable cross-dock according to claim 2, wherein at least one of the first body and the second body can be shifted laterally towards the other of the first body and the second body relative to legs upon which the at least one of the first body and the second body are positioned.

4. A moveable cross-dock according to claim 1, further comprising a lateral shifting assembly on at least one of the first moveable cross-dock section and the second moveable cross-dock section that can selectively shift the at least one of the first moveable cross-dock section and the second moveable cross-dock section towards the other of the first moveable cross-dock section and the second moveable cross-dock section.

5. A moveable cross-dock according to claim 1, further comprising a weighing station within at least one of the first moveable cross-dock section and the second moveable cross-dock section configured to weigh freight positioned thereon.

6. A moveable cross-dock according to claim 1, wherein at least one of the first moveable cross-dock section and the second moveable cross-dock section further comprises a set of one or more lock boxes having interiors that are accessible at least from the interior storage area.

7. A moveable cross-dock according to claim 6, wherein the interiors of the lock boxes are accessible from an exterior of the moveable cross-dock sections when the first moveable cross-dock section is secured to the second moveable cross-dock section.

8. A moveable cross-dock for the redistribution of freight between freight containers, the moveable cross-dock comprising:
at least two moveable cross-dock sections each having at least two wheels enabling rolling movement of the first moveable cross-dock section, and a body supported by the at least two wheels of the moveable cross-dock section;

a coupling mechanism to releasably secure together the at least two moveable cross-dock sections so that the bodies of the at least two moveable cross-dock sections enclose an interior storage area;

a first opening and a second opening in one or more of the bodies of the at least two moveable cross-dock sections through which freight may be moved into and out of the interior storage area; and a third opening extending along approximately the entire length of a first long lateral side of the body of each of the at least two moveable cross-dock sections.

9. A moveable cross-dock according to claim 8, wherein the bodies of adjacent pairs of the at least one moveable cross-dock sections have a compressible seal positioned therebetween and substantially entirely surrounding the third openings when the at least two moveable cross-dock sections are secured together.

10. A moveable cross-dock according to claim 9, wherein the body can be shifted laterally towards the body of the other at least two moveable cross-dock sections relative to legs upon which the body is positioned.

11. A moveable cross-dock according to claim 8, further comprising a lateral shifting assembly on one or more of the at least two moveable cross-dock sections that can selectively shift the one or more of the at least two moveable cross-dock sections towards adjacent ones of the at least two moveable cross-dock sections.

12. A moveable cross-dock according to claim 8, further comprising a weighing station within the at least two moveable cross-dock sections configured to weigh freight positioned thereon.

13. A moveable cross-dock according to claim 8, wherein the at least two moveable cross-dock sections further comprise a set of one or more lock boxes having interiors that are accessible at least from the interior storage area.

14. A moveable cross-dock according to claim 13, wherein the interiors of the one or more lock boxes are accessible from an exterior of the at least two moveable cross-dock sections when the at least two moveable cross-dock sections are secured to one another.

* * * * *